(12) United States Patent
Greiner et al.

(10) Patent No.: US 7,260,290 B1
(45) Date of Patent: Aug. 21, 2007

(54) DISTRIBUTED OPTICAL STRUCTURES EXHIBITING REDUCED OPTICAL LOSS

(75) Inventors: Christoph M. Greiner, Eugene, OR (US); Dmitri Iazikov, Springfield, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 51 days.

(21) Appl. No.: 11/021,549

(22) Filed: Dec. 23, 2004

Related U.S. Application Data

(60) Provisional application No. 60/553,846, filed on Mar. 16, 2004, provisional application No. 60/532,611, filed on Dec. 24, 2003.

(51) Int. Cl.
  *G02B 6/34* (2006.01)
(52) U.S. Cl. .............................. 385/37
(58) Field of Classification Search ............ None
  See application file for complete search history.

(56) References Cited

U.S. PATENT DOCUMENTS

| | | |
|---|---|---|
| 3,995,937 A | 12/1976 | Baues et al. |
| 4,006,967 A | 2/1977 | Kenan et al. |
| 4,140,362 A | 2/1979 | Tien |
| 4,387,955 A | 6/1983 | Ludman et al. |
| 4,440,468 A | 4/1984 | Auracher et al. |
| 4,660,934 A | 4/1987 | Akiba et al. |
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |

(Continued)

FOREIGN PATENT DOCUMENTS

EP  0 310 438 A1  4/1989

(Continued)

OTHER PUBLICATIONS

Capron et al, J. Lightwave Tech., vol. 11 No. 12 pp. 2009-2014 (Dec. 1993).

(Continued)

*Primary Examiner*—Rodney Bovernick
*Assistant Examiner*—Mike Stahl
(74) *Attorney, Agent, or Firm*—David S. Alavi

(57) ABSTRACT

An optical waveguide includes a set of diffractive elements. The diffractive element set routes within the waveguide a diffracted portion of an input optical signal between input and output optical ports. The input optical signal is successively incident on the diffractive elements. The optical signal propagates in the waveguide in a corresponding signal optical transverse mode substantially confined in at least one transverse dimension. A modal index of the signal optical mode or a modal index of a loss optical mode spatially varies along a signal propagation direction within the optical waveguide, or the loss optical mode is optically damped as it propagates along the optical waveguide. Said signal modal index variation, said loss modal index variation, or said loss mode damping yields a level of optical coupling between the signal optical mode and the loss optical mode at or below an operationally acceptable level.

28 Claims, 21 Drawing Sheets

U.S. PATENT DOCUMENTS

| | | | |
|---|---|---|---|
| 4,834,474 A | 5/1989 | George et al. | |
| 4,846,552 A | 7/1989 | Veldkamp et al. | |
| 4,852,960 A | 8/1989 | Alferness et al. | |
| 4,923,271 A | 5/1990 | Henry et al. | |
| 4,938,553 A | 7/1990 | Maerz et al. | |
| 5,040,864 A | 8/1991 | Hong | |
| 5,093,874 A | 3/1992 | Hawkins et al. | |
| 5,107,359 A | 4/1992 | Ohuchida | |
| 5,165,104 A | 11/1992 | Weverka | |
| 5,195,161 A | 3/1993 | Adar et al. | |
| 5,357,591 A | 10/1994 | Jiang et al. | |
| 5,450,511 A | 9/1995 | Dragone | |
| 5,453,871 A | 9/1995 | Kolner et al. | |
| 5,668,900 A | 9/1997 | Little et al. | |
| 5,768,450 A | 6/1998 | Bhagavatula | |
| 5,812,318 A | 9/1998 | Babbitt et al. | |
| 5,830,622 A | 11/1998 | Canning et al. | |
| 5,907,647 A * | 5/1999 | Eggleton et al. | 385/28 |
| 5,995,691 A * | 11/1999 | Arai et al. | 385/37 |
| 6,011,884 A | 1/2000 | Dueck et al. | |
| 6,011,885 A | 1/2000 | Dempewolf et al. | |
| 6,137,933 A | 10/2000 | Hunter et al. | |
| 6,144,480 A | 11/2000 | Li et al. | |
| 6,169,613 B1 | 1/2001 | Amitai et al. | |
| 6,169,614 B1 | 1/2001 | Whitcomb et al. | |
| 6,266,463 B1 * | 7/2001 | Laming et al. | 385/37 |
| 6,285,813 B1 | 9/2001 | Schultz et al. | |
| 6,323,970 B1 | 11/2001 | Popovich | |
| 6,408,118 B1 * | 6/2002 | Ahuja et al. | 385/37 |
| 6,473,232 B2 | 10/2002 | Ogawa | |
| 6,553,162 B1 | 4/2003 | Okayama | |
| 6,603,901 B1 * | 8/2003 | Hale et al. | 385/37 |
| 6,678,429 B2 | 1/2004 | Mossberg et al. | |
| 6,702,897 B2 | 3/2004 | Cullen et al. | |
| 6,718,093 B2 | 4/2004 | Zhou | |
| 6,768,834 B1 | 7/2004 | Gruhlke | |
| 6,823,115 B2 | 11/2004 | Greiner et al. | |
| 6,829,417 B2 | 12/2004 | Greiner et al. | |
| 6,850,670 B2 | 2/2005 | Parhami et al. | |
| 6,859,318 B1 | 2/2005 | Mossberg | |
| 6,876,791 B2 * | 4/2005 | Murashima et al. | 385/37 |
| 6,879,441 B1 | 4/2005 | Mossberg | |
| 6,928,223 B2 | 8/2005 | Walpole et al. | |
| 6,961,491 B2 | 11/2005 | Greiner et al. | |
| 6,965,464 B2 | 11/2005 | Mossberg | |
| 6,965,716 B2 | 11/2005 | Greiner et al. | |
| 6,985,656 B2 | 1/2006 | Iazikov et al. | |
| 6,987,911 B2 | 1/2006 | Mossberg et al. | |
| 6,990,276 B2 | 1/2006 | Brice et al. | |
| 6,993,223 B2 | 1/2006 | Greiner et al. | |
| 7,003,187 B2 | 2/2006 | Frick et al. | |
| 7,009,743 B2 | 3/2006 | Mossberg | |
| 7,016,569 B2 | 3/2006 | Mule et al. | |
| 7,049,704 B2 | 5/2006 | Chakravorty et al. | |
| 7,054,517 B2 | 5/2006 | Mossberg et al. | |
| 7,062,128 B2 | 6/2006 | Mossberg | |
| 7,116,453 B2 | 10/2006 | Mossberg | |
| 7,116,852 B2 | 10/2006 | Tuda | |
| 7,120,334 B1 | 10/2006 | Greiner et al. | |
| 7,123,794 B2 | 10/2006 | Greiner et al. | |
| 2002/0071646 A1 * | 6/2002 | Eggleton et al. | 385/125 |
| 2003/0011833 A1 | 1/2003 | Yankov et al. | |
| 2003/0039444 A1 | 2/2003 | Mossberg et al. | |
| 2003/0068113 A1 | 4/2003 | Janz et al. | |
| 2003/0117677 A1 | 6/2003 | Mossberg | |
| 2004/0076374 A1 | 4/2004 | Greiner et al. | |
| 2004/0131360 A1 | 7/2004 | Iazikov et al. | |
| 2004/0170356 A1 | 9/2004 | Iazikov et al. | |
| 2004/0179779 A1 | 9/2004 | Greiner et al. | |
| 2004/0208466 A1 | 10/2004 | Mossberg et al. | |
| 2004/0258356 A1 | 12/2004 | Brice et al. | |
| 2005/0018951 A1 | 1/2005 | Mossberg et al. | |
| 2005/0063430 A1 | 3/2005 | Doucet et al. | |
| 2005/0078912 A1 | 4/2005 | Iazikov et al. | |
| 2005/0135744 A1 | 6/2005 | Greiner et al. | |
| 2005/0135745 A1 | 6/2005 | Greiner et al. | |
| 2005/0135747 A1 | 6/2005 | Greiner et al. | |
| 2005/0152011 A1 | 7/2005 | Mossberg | |
| 2005/0163425 A1 | 7/2005 | Greiner et al. | |
| 2005/0196114 A1 | 9/2005 | Xu et al. | |
| 2006/0023280 A1 | 2/2006 | Mossberg | |
| 2006/0139712 A1 | 6/2006 | Mossberg | |
| 2006/0177178 A1 | 8/2006 | Greiner et al. | |
| 2006/0193553 A1 | 8/2006 | Mossberg | |
| 2006/0210214 A1 | 9/2006 | Uhlhorn et al. | |
| 2006/0233493 A1 | 10/2006 | Mossberg | |

FOREIGN PATENT DOCUMENTS

| | | |
|---|---|---|
| GB | 2 168 215 A | 6/1986 |
| WO | WO-99/35523 A1 | 7/1999 |
| WO | WO-99/56159 A1 | 11/1999 |
| WO | WO 02-075411 | 9/2002 |

OTHER PUBLICATIONS

Deri et al, IEEE Photonics Tech. Lett., vol. 6 No. 2 pp. 242-244 (Feb. 1994).
Grunnet-Jepsen et al, Electron. Lett., vol. 35 No. 13 pp. 1096-1097 (Jun. 1999).
Paddon et al, Opt. Lett., vol. 23 No. 19 pp. 1529-1531 (Oct. 1998).
Madsen et al, IEEE J. Sel. Top. Quant. Elec., vol. 4 No. 6 pp. 925-929 (Nov./Dec. 1998).
Gini et al, Lightwave Tech., vol. 16 No. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., Vol. 7 No. 3 pp. 324-326 (Mar. 1995).
Takenouchi et al, Optics Express, vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (Mar. 1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron. Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl. Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron. Lett., vol. 29 No. 9 p. 805 (Apr. 1993).
Li, Opt. Commum., vol. 114 pp. 406-412 (Feb. 1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).
Cowin et al Electron. Lett., vol. 35 No. 13 pp. 1074-1076 (Jun. 1999).
Canning et al, Opt. Commun., vol. 171 pp. 213-217 (Dec. 1999).
Tien et al, Use of concentric-arc grating as a thin-film spectrograph for guided waves, Am. Inst. of Physics pp. 524-525 (Sep. 1980).
Kaneko et al, IEEE J. Sel. Top. Quant. Elec., vol. 5 No. 5 pp. 1227-1236 (Sep./Oct. 1999).
Sun et al, IEEE Photonics Tech. Lett., vol. 10 No. 1 pp. 90-92 (Jan. 1998).

McGreer, IEEE Photonics Tech. Lett., vol. 8 No. 4 pp. 551-553 (Apr. 1996).

Avrutsky et al, IEEE Photonics Tech. Lett., vol. 10 No. 6 pp. 839-841 (Jun. 1998).

Alavie et al, IEEE Photonics Tech. Lett., vol. 5 No. 9 pp. 1112-1114 (Sep. 1993).

Fu et al, Opt. Lett., vol. 22 No. 21 pp. 1627-1629 (Nov. 1997).

Wang et al, IEEE Photonics Tech. Lett., vol. 3 No. 1 pp. 36-38 (Jan. 1991).

Wang et al Opt. Lett., vol. 15 No. 7 pp. 363-365 (Apr. 1990).

Wu et al, J. Lightwave Tech., vol. 10 No. 11 pp. 1575-1589 (Nov. 1992).

Eldada et al, IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characteristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiesman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995).

Mossberg, Opt. Lett., vol. 26 No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973), month unknown.

Hirayama et al, Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson etal, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

\* cited by examiner

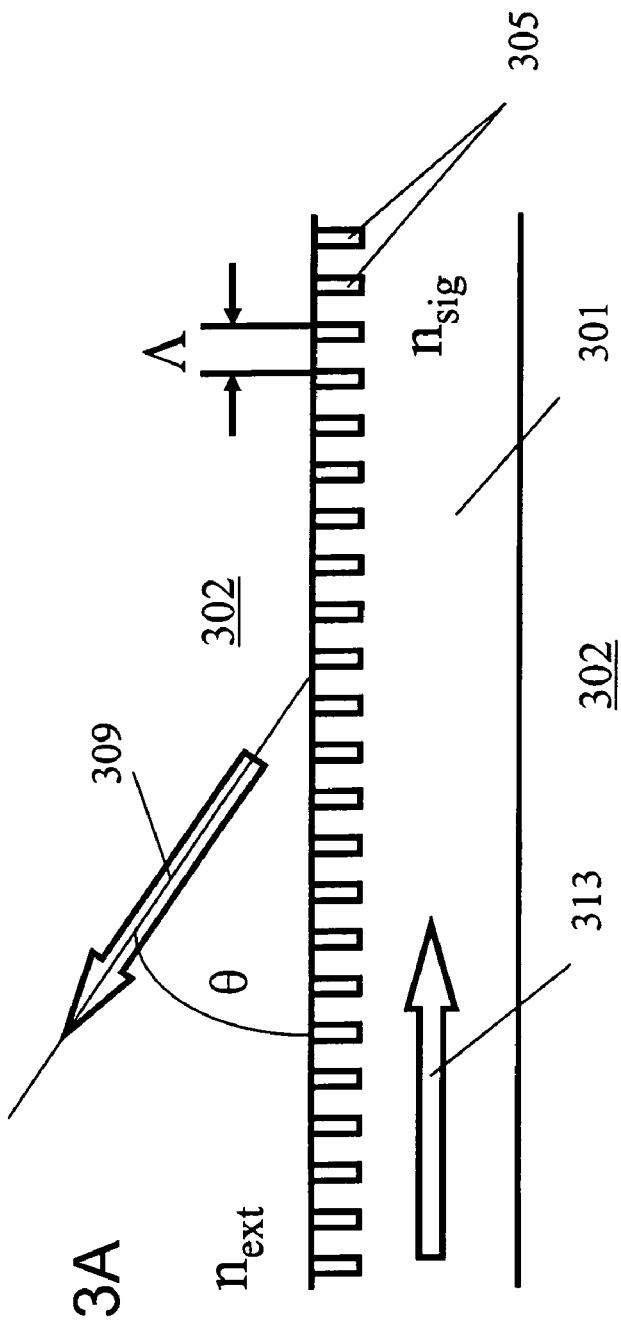
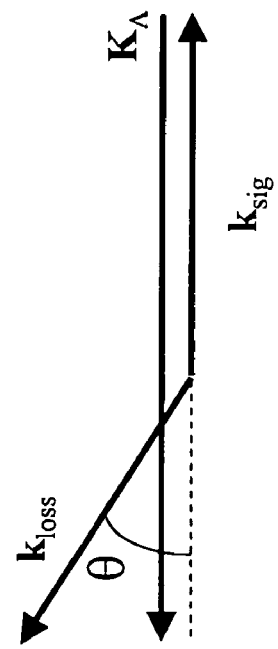
Figure 3A
Figure 3B

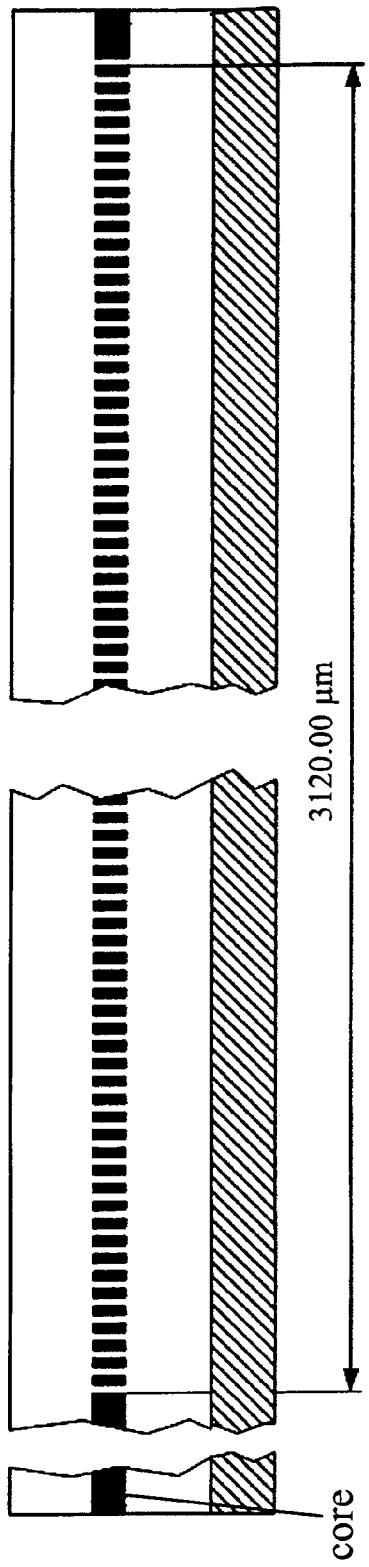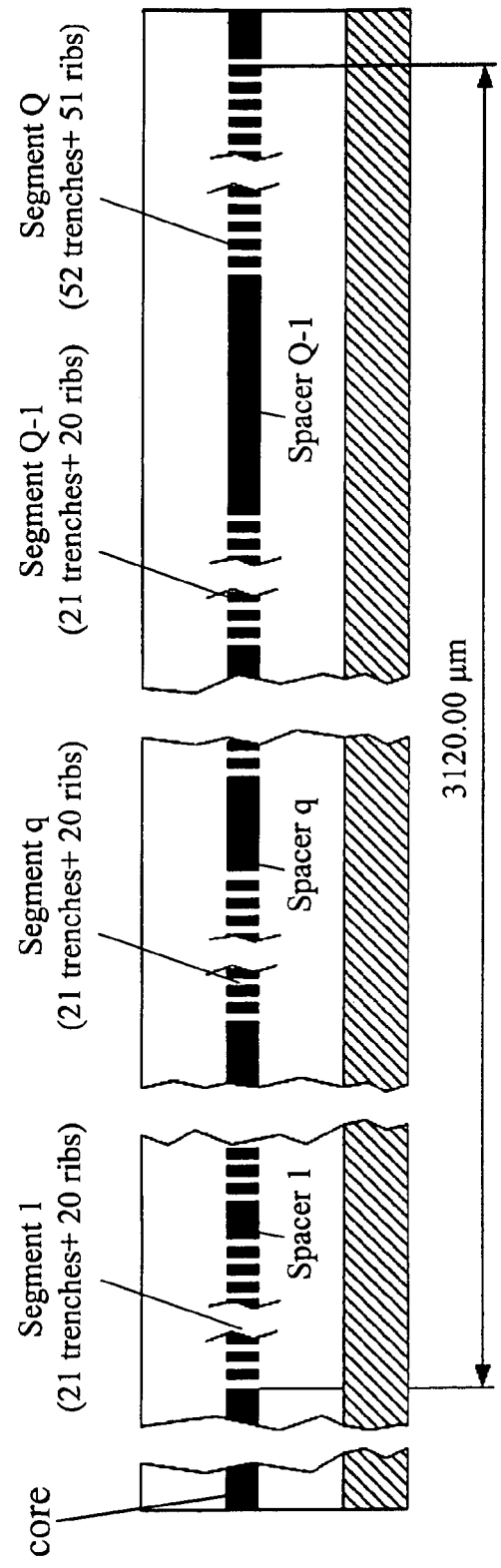
Figure 17A
Figure 17B

DISTRIBUTED OPTICAL STRUCTURES EXHIBITING REDUCED OPTICAL LOSS

BENEFIT CLAIMS TO RELATED APPLICATIONS

This application claims benefit of: i) prior-filed co-pending provisional App. No. 60/532,611 filed Dec. 24, 2003 in the names of Thomas W. Mossberg, Christoph M. Greiner, and Dmitri Iazikov; and ii) prior-filed co-pending provisional App. No. 60/553,846 filed Mar. 16, 2004 in the names of Thomas W. Mossberg, Dmitri Iazikov, and Christoph M. Greiner. Each of said App. Nos. 60/532,611 and 60/553,846 is hereby incorporated by reference as if fully set forth herein.

BACKGROUND

The field of the present invention relates to optical devices incorporating distributed optical structures. In particular, distributed optical structures exhibiting reduced optical loss are disclosed herein.

One or more distributed optical structures (i.e., sets of diffractive elements) in a channel waveguide, an optical fiber, a slab waveguide, or another guided-wave optical structure may be used in a variety of devices for spectral filtering, laser frequency control, spectral multiplexing, optical sensing, or other functions. It is often important that such devices operate with levels of optical loss at or below an operationally acceptable level. In some instances a distributed optical structure generates loss by coupling a portion of a guided optical signal into an unwanted cladding, free-space, or other mode, wherein the coupled optical power is dissipated without useful function. Distributed optical structures wherein the level of coupling between a signal optical mode and one or more loss optical modes (i.e., mode(s) not associated with the intended function of the device) is reduced, thereby reducing optical loss of the device, are disclosed herein.

Various embodiments, implementations, and adaptations of such diffractive element sets are disclosed in: application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006); application Ser. No. 10/898,527 filed Jul. 22, 2004 in the named of Dmitri Iazikov, Christoph M. Greiner, and Thomas W. Mossberg (now U.S. Pat. No. 7,194,164 issued Mar. 20, 2007); application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005); application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004); application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005); application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004); application Ser. No. 10/229,444 filed Aug. 27, 2002 in the names of Thomas W. Mossberg and Christoph M. Greiner (now U.S. Pat. No. 6,678,429 issued Jan. 13, 2004); application Ser. No. 10/602,327 filed Jun. 23, 2003 in the name of Thomas W. Mossberg (now U.S. Pat. No. 6,859,318 issued Feb. 22, 2005); application Ser. No. 09/811,081 filed Mar. 16, 2001 in the name of Thomas W. Mossberg (now U.S. Pat. No. 6,879,441 issued Apr. 12, 2005). Each of said applications is hereby incorporated by reference as if fully set forth herein.

SUMMARY

An optical apparatus comprises a planar optical waveguide having at least one set of diffractive elements, the optical waveguide substantially confining in at least one transverse spatial dimension optical signals propagating therein. Each diffractive element set routes, between corresponding input and output optical ports, a corresponding diffracted portion of an input optical signal propagating in the optical waveguide that is diffracted by the diffractive element set. The input optical signal is successively incident on the diffractive elements. The optical signals propagate in the optical waveguide in corresponding signal optical transverse modes substantially confined in at least one transverse dimension by the optical waveguide. A modal index of the signal optical mode spatially varies along an optical signal propagation direction within the optical waveguide, a modal index of at least one loss optical mode spatially varies along the optical signal propagation direction within the optical waveguide, or the loss optical mode is optically damped as it propagates along the optical waveguide. Said signal modal index variation, said loss modal index variation, or said loss mode damping yields a level of optical coupling between the signal optical mode and the loss optical mode at or below an operationally acceptable level.

Objects and advantages pertaining to diffractive element sets in an optical waveguide may become apparent upon referring to the disclosed exemplary embodiments as illustrated in the drawings and disclosed in the following written description and/or claims.

BRIEF DESCRIPTION OF THE DRAWINGS

FIG. 3A is a schematic cross-section of an exemplary optical waveguide with a set of diffractive elements; FIG. 3B is a corresponding wavevector diagram.

FIGS. 17A and 17B are schematic cross-sections of exemplary planar optical waveguides with corresponding sets of diffractive elements.

Figure 1:
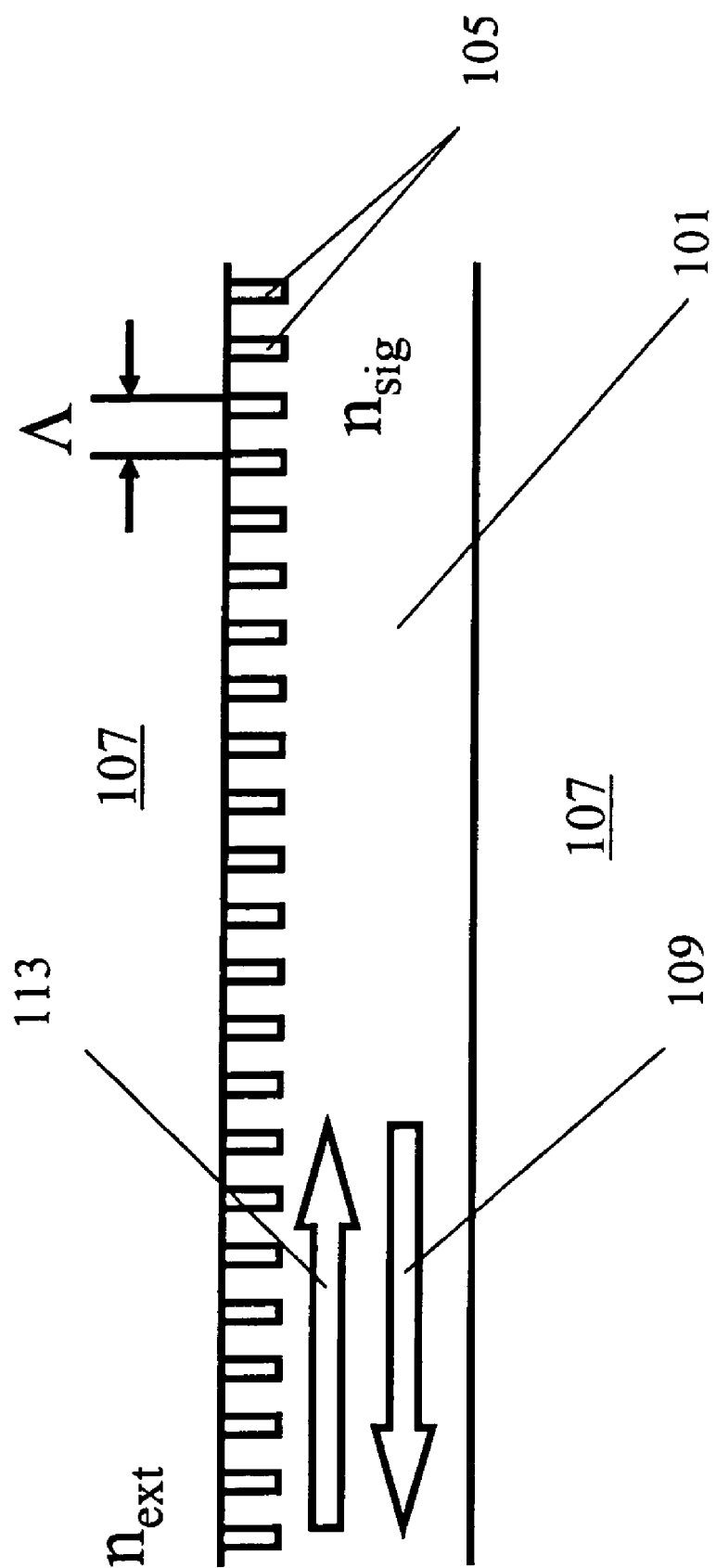
FIG. 1 is a schematic cross-section of an exemplary optical waveguide with a set of diffractive elements.

In the Figures, typically only a few diffractive elements are shown out of an entire diffractive element set, which may contain anywhere from a few, dozens, hundreds, or even thousands of diffractive elements. The Figures may illustrate the waveguide or diffractive elements schematically, and therefore may not show all structures in their proper shape or proportions. In many of the Figures, an optical waveguide and the diffractive elements thereof are shown in cross section. Unless specifically stated otherwise, such cross-sectional Figures may represent both channel and slab waveguides, as well as other guided-wave optical structures. The local direction of optical propagation (i.e., the longitudinal dimension) is substantially horizontal (with respect to both the orientation of such Figures as well as a substantially horizontal planar waveguide substrate, which may be present but is not shown in the Figures). Two transverse dimensions are defined locally as perpendicular to the local longitudinal dimension. For both channel and slab waveguides the supported optical modes are substantially confined in the vertical transverse dimension of the cross-sectional Figures (vertical with respect to both the orientation of the Figure as well as a substantially horizontal planar waveguide substrate, if present). The horizontal transverse dimension is substantially normal to the plane of such Figures, and substantially parallel to a planar waveguide substrate (if present); a slab waveguide permits optical signal propagation in said horizontal transverse dimension, while a channel optical waveguide substantially confines the optical signal in the horizontal transverse dimension.

In the Figures, optical modes propagating within, along, or near a planar optical 9 waveguide are represented by arrows indicating the direction of propagation, with the thickness of the arrow giving a schematic indication of the vertical transverse extent of the optical mode in question. Signal optical modes are typically depicted as propagating substantially within the core of a planar waveguide (using relatively thin arrows) although they may extend somewhat into the cladding, while loss optical modes are typically depicted as propagating outside the planar waveguide core, or as sufficiently great in vertical extent so as to span the core layer and extend substantially into the cladding layers (indicated by relatively thick arrows). In many of the Figures a signal optical mode and a loss optical mode are shown counter-propagating; however, the adaptations disclosed or claimed herein also apply when the signal and loss modes co-propagate.

The embodiments shown in the Figures are exemplary, and should not be construed as limiting the scope of the present disclosure or appended claims.

DETAILED DESCRIPTION OF EMBODIMENTS

An optical apparatus according to the present disclosure comprises an optical element having at least one set of diffractive elements. The optical element may comprise a planar optical waveguide substantially confining in at least one transverse spatial dimension optical signals propagating therein. A planar optical waveguide is generally formed on or from a substantially planar substrate of some sort. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. More generally, the adaptations disclosed or claimed herein may be implemented in any guided-wave optical structure, including grating-like structures. The disclosed adaptations may be applied to channel, slab, rib, fiber, and other guided-wave optical structures known in the art. In the present disclosure, planar waveguides are specifically referred to for concreteness only, and the various exemplary embodiments described herein may be implemented in other guided-wave optical structures as well.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The indices $n_1$, $n_2$, or $n_{core}$ may be spatially substantially uniform over the planar waveguide, or may spatially vary over the extent of the planar waveguide, as set forth hereinbelow. The core or cladding(s) may comprise multiple materials having different indices. A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including those disclosed in the references cited herein. Each linear or curvilinear diffractive element is shaped to direct its diffracted portion of the optical signal to an output optical port. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that an optical port (input and/or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As set forth in prior-filed co-pending application Ser. No. 10/998,185 (cited hereinabove), diffracting regions of a diffractive element set may be distributed over one or more spatial regions of the optical element, for facilitating placement of multiple diffractive element sets in a single optical element. These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. In addition, the arrangement of these spatial regions may be made according to the teachings of the present application, as set forth hereinbelow, for reducing unwanted optical coupling of optical signal mode(s) into optical loss mode(s). The word "primitive" may be used to designate one diffractive element set among multiple diffractive element sets in a single optical element (e.g., a single optical device may include multiple "primitive programmed holographic structures").

A given set of diffractive elements provides dual functionality, spatially routing a diffracted portion of an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss (at least with respect to contour shape). Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited herein. The following are exemplary only, and are not intended to be exhaustive. The teachings of the present disclosure pertaining to reducing optical loss for a diffractive element set in a planar waveguide may be implemented regardless of the method(s) employed for forming the planar waveguide or diffractive element set(s) thereof.

Diffractive elements may be formed lithographically on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask onto the surface of the planar waveguide (referred to herein as external photoexposure) so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate in the planar waveguide (referred to herein as internal photoexposure), thereby recording in the planar waveguide an interference pattern. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

The following definitions shall apply to the following discussion:

signal optical mode—functionally defined as a substantially confined transverse optical mode that is related to the intended function of an optical apparatus; such a function-related mode may or may not be resonant with a diffractive element set of the apparatus, and therefore may be reflected by or transmitted by a diffractive element set; in a single-mode waveguide there may be only one signal mode, while in multi-mode waveguides there may be multiple signal modes; not all optical modes supported by the waveguide or confined by index contrast between waveguide core and cladding are necessarily signal modes, but only those mode(s) that are related to the intended function of the diffractive element set;

loss optical mode—functionally defined as an optical mode that is not related to the intended function of the diffractive element set; a loss mode may be supported by the waveguide or confined by index contrast between waveguide core and cladding, or may be confined by index contrast between waveguide cladding and a surrounding medium (so-called "cladding modes"), or be substantially unconfined or freely propagating within or outside the cladding;

$n_{sig}$—effective refractive index of an optical signal propagating in a particular signal mode of an optical waveguide; depending on the specific waveguide morphology, the effective refractive index may differ from bulk material indices, as is known in the art;

$n_{loss}$—effective refractive index of a loss optical mode to which a signal mode may be coupled thereby resulting in an unwanted source of optical power loss; depending on the specific waveguide morphology, the effective refractive index may differ from bulk material indices, as is known in the art;

$n_{ext}$—bulk refractive index of the spatial region adjacent to a waveguide core;

$n_{core}$—bulk refractive index of the waveguide core material;

$n_x(z)$—where x=sig, loss, ext, core, etc: bulk or effective refractive index as a function of position coordinate z defined locally along the direction of optical signal propagation;

$\Lambda(z)$—physical distance between adjacent diffractive element contours as a function of position coordinate z defined locally along the direction of optical signal propagation;

$\delta s^D(z)$—optical path length between adjacent diffractive element contours (i.e., $\Lambda(z) \cdot n_{sig}(z)$, or physical distance times signal mode effective refractive index) as a function of position coordinate z defined locally along the direction of optical signal propagation; the function $\delta s^D(z)$ determines at least in part the spectral transfer function of the diffractive element set;

$\alpha_o(z)$—optical field coupling coefficient per unit length of a diffractive element set for optical coupling between a given signal optical mode and a given loss optical mode, as a function of position coordinate z defined locally along the direction of optical signal propagation; and $\phi_o(z)$—relative phase between the given signal optical mode field and the given loss optical mode field, as a function of position coordinate z defined locally along the direction of optical signal propagation.

System Overview

FIG. 1 schematically depicts an exemplary optical waveguide in cross section. The waveguide is intended to be generic and may specifically refer to a channel waveguide, a slab waveguide, an optical fiber, or other optical element with a set of diffractive elements that may be known in the art. The waveguide may support one or more signal optical transverse modes each having a characteristic transverse field distribution and polarization state. Such optical signals are substantially confined in the vertical transverse dimension (as shown) primarily by the index contrast between waveguide core 101 and claddings 107, and experience an effective refractive index of $n_{sig}$. Signal optical modes may significantly penetrate the cladding regions, so that $n_{sig}$ depends on $n_{core}$ (the bulk index of the core material), $n_{ext}$ (the bulk index of the cladding material), the waveguide morphology, and the optical signal wavelength $\lambda_{sig}$; however, this fact does not limit the applicability of the optical loss reduction adaptations disclosed herein. The effective refractive index $n_{sig}$ will typically be different for light signals propagating in different waveguide modes. The cladding material may be similar to the core material (e.g. a differentially doped silica glass), or it may be air or vacuum, or it may be any of myriad cladding types known in the art. For convenience of exposition, it is assumed herein that a unique external bulk refractive index $n_{ext}$ may characterize the spatial regions of the planar waveguide outside the core region. However, various planar waveguide structures may employ multiple different cladding materials having different refractive indices, and the optical loss adaptations disclosed herein are applicable regardless of the detailed waveguide morphology and complexity.

Shown at the top of the core region 101 in FIG. 1 are cross-sections of multiple diffractive elements 105 representing, for example, trenches etched into the core material and filled with cladding material. Any other suitable structure and composition for the diffractive elements may be equivalently employed. The diffractive elements 105 are shown in cross section and may be considered to run in and out of the plane of the Figure. Specifics as to cross section and shape do not substantially affect the general approach to loss reduction disclosed herein. An input signal (represented by arrow 113) propagates along the planar optical waveguide and is guided or substantially confined in the vertical transverse dimension by index contrast between the core layer 101 and cladding 107. A set of substantially uniformly spaced diffractive elements will cooperatively backscatter light whose vacuum wavelength $\lambda_{res}$ approximately satisfies the resonance relation $m\lambda_{res}=2n_{sig}\Lambda$, where $\Lambda$ represents the physical distance between adjacent diffractive contours, and m (a positive integer) represents the diffractive order. The resonance relation may be rewritten as $m\lambda_{res}/2=\delta s\equiv n_{sig}\Lambda$, where $\delta s$ is defined to be the optical path difference between adjacent diffractive contours. A backscattered signal (represented by arrow 109) diffracted by the diffractive element set in accordance with this resonance condition is shown in FIG. 1. While a backscattered diffracted signal is shown, either or both of a forward scattered signal or a backscattered signal may be useful for providing device functionality. Optical signals with various wavelengths, that may or may not be in resonance with the diffractive element set, may propagate through the device during its operation (i.e., wavelengths within an "operational wavelength range"). It may be desirable to suppress optical loss for optical signals across the entire operational wavelength range, or perhaps for only a portion of the operational wavelength range. In order to apodize a diffractive element set to provide a tailored spectral response function, the optical path distance between adjacent diffractive elements may typically be varied in a designed fashion along the direction of optical signal propagation; $\delta s^D(z)$ may be defined as the designed optical path differences as a function of position. $\delta s^D(z)$ may be determined using methods known in the art to provide spectral filtering needed for a particular application. The precise form of $\delta s^D(z)$ is immaterial to implementation of the adaptations disclosed herein for reduction of optical loss, and $\delta s^D(z)$ may be treated as a design input therefor. The adaptations disclosed herein may be implemented for reducing coupling between at least one signal optical mode and at least one loss optical mode, without substantially altering $\delta s^D(z)$ or changing the spectral transfer function of the diffractive element set. In most cases where $n_{sig}$ is substantially spatially uniform, variation in the optical path distance between adjacent diffractive elements requires corresponding variation in the physical separation between adjacent diffractive elements, i.e. $\Lambda=\Lambda(z)$. As discussed hereinbelow, such variation does not substantially alter implementation of loss reduction adaptations disclosed herein. In a diffractive element set for which $\delta s^D(z)$ varies with position, there is typically not a unique resonance condition. This aspect of an apodized or otherwise structured diffractive element set also does not compromise implementation of adaptations for loss reduction disclosed herein.

Figures 2A, 2B, 2C:
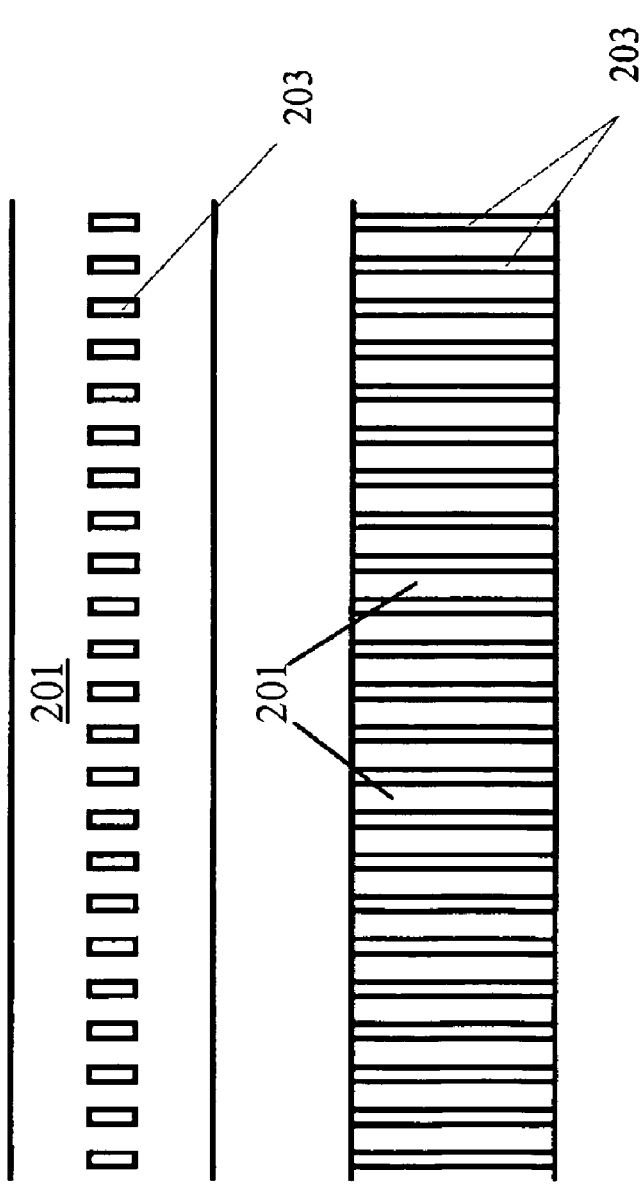
FIGS. 2A-2C are schematic cross-sections of exemplary optical waveguides with corresponding sets of diffractive elements.

FIGS. 2A-2C schematically depict several other exemplary waveguide geometries (all shown in cross section with diffractive elements running in and out of the plane of the Figure). FIG. 2A shows a waveguide wherein the diffractive elements 203 are located within the core waveguide layer 201. FIG. 2B shows a waveguide where the core layer 201 is etched through essentially completely with etched regions filled with cladding or other substantially transparent filler material to form diffractive elements 203. FIG. 2C shows a waveguide with diffractive elements 203 located within the waveguide core layer 201 and explicitly shows cladding layers 207. In some embodiments, one or both cladding layers may comprise air or vacuum; or the cladding layers may be sufficiently thick so as to be substantially equivalent to cladding of infinite thickness, wherein optical modes may propagate substantially as if in a homogeneous medium. Each of the exemplary waveguide geometries shown in FIGS. 2A-2C, as well as myriad other waveguide and diffractive element geometries known in the art, may benefit from the loss reduction adaptations disclosed herein.

Coupling Between Signal Modes and Loss Modes

FIG. 3A schematically illustrates an exemplary planar optical waveguide structure with diffractive elements 305 located near the top of the core layer 301. Also shown is an input signal (represented by arrow 313) assumed to propagate in a particular optical transverse mode substantially confined in at least one transverse dimension by the waveguide. A dissipative loss optical mode (unrelated to the designed function of the waveguide and diffractive elements 305 thereof; represented by arrow 309) is shown propagating above and away from the core layer 301. In this example the loss optical mode is assumed to be substantially unbound (i.e., propagates substantially freely within the cladding layer 302 from near the core layer 301). The loss optical mode may arise, for example, as a diffractive output order of the set of all diffractive elements 305. FIG. 3B shows a propagation vector addition diagram which may be used to illustrate conditions under which coupling between the signal optical mode and the loss optical mode may occur. In describing the diagram, it is convenient to define: i) $K_\Lambda\equiv 2\pi/\Lambda$; ii) $k_{sig}\equiv 2\pi n_{sig}/\lambda_{sig}$ where $\lambda_{sig}$ is any signal wavelength in the operational wavelength range; iii) $k_{loss}^P=2\pi n_{ext}\cos\theta/\lambda_{loss}$ where $\lambda_{loss}$ is the vacuum wavelength of the loss optical mode field ($k_{loss}^P$ is the component of the loss optical mode propagation vector parallel to the waveguide); and iv) $\Delta k=K_\Lambda-(k_{sig}+k_{loss}^P)$. In purely linear optical materials, it will normally be the case that $\lambda_{loss}\lambda_{sig}$. However, the present loss mitigation adaptations may be implemented equally well to cases when the loss optical mode signal has been wavelength shifted as, for example, via a non-linear optical material.

A coefficient $\gamma(L)$ may be defined to represent the relative optical field coupling strength of the entire set of diffractive elements between the signal optical mode and the loss optical mode, with $$\gamma(L) \propto \left|\int_0^L \alpha_0 \exp(i\Delta k \cdot z)\,dz\right|, \qquad \text{Eq. (1)}$$

where: 0 and L represent the beginning and ending positions of the diffractive element set, respectively; $\alpha_o$ is a scattering strength constant related to diffractive element and waveguide cross sections and relative refractive indices; and z is the position coordinate along the signal-mode propagation direction. The quantity $\phi_o(z)\equiv\Delta k\cdot z$, which appears in the complex exponent of Eq. (1), represents the spatially varying phase difference between the signal light scattered by the diffractive elements and the loss mode field. It is apparent from Eq. (1) that $\gamma(L)$ achieves its largest magnitude when $\Delta k=0$, which implies that the scattered signal field and loss-mode field have a spatially invariant relative phase (i.e., are phase-matched). When the power carried by the signal optical mode is only weakly depleted by coupling to the loss optical mode, the power coupled to the loss mode varies approximately as the square of the coupling coefficient $\gamma(L)$.

For the discussion of FIGS. 3A and 3B, it has been assumed that optical modes propagating outside the core layer 301 may be treated as if propagating through a substantially homogeneous medium. This situation may pertain when the cladding 302 comprises a substantially uniform and transparent medium (vacuum, air, dielectric material, and so on), having an optical thickness sufficiently large to provide a spectrally and angularly dense set of freely propagating loss optical modes. The precise nature of the loss modes does not substantially influence implementation of optical loss reduction adaptations disclosed herein. Optical coupling of a signal optical mode (related to device function) to any finite range of loss optical modes (substantially unrelated to device function) may be suppressed by the adaptations disclosed herein regardless of the detailed nature of the loss optical mode(s).

Figure 4A:
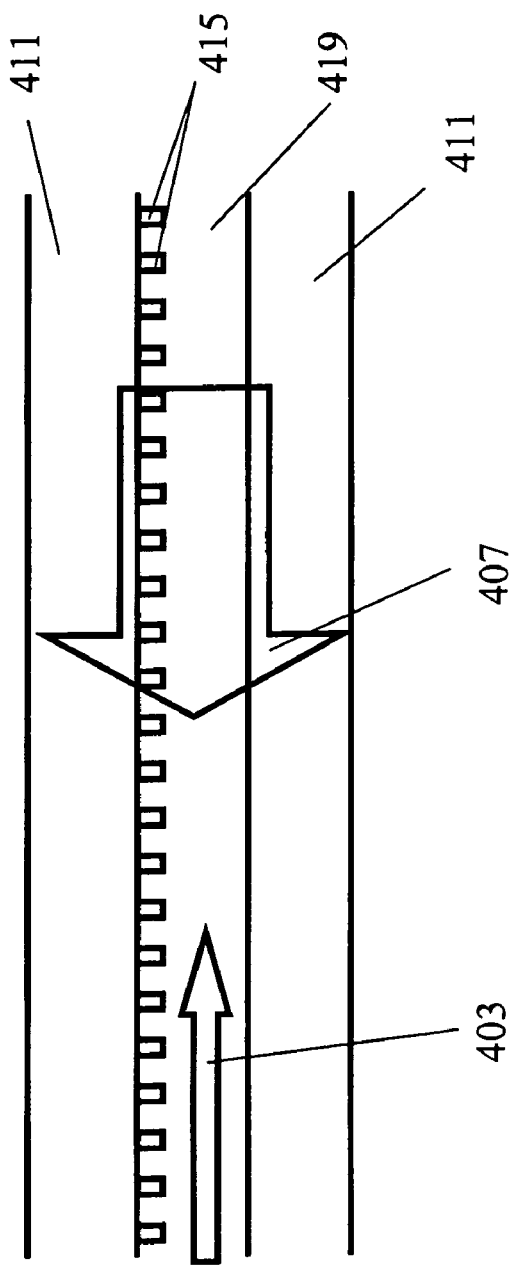
FIG. 4A is a schematic cross-section of an exemplary optical waveguide with a set of diffractive elements.
Figure 4B:
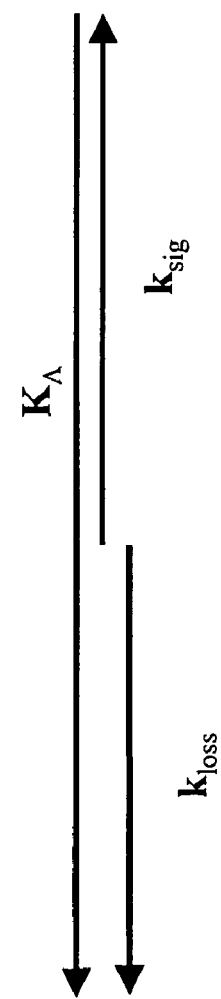
FIG. 4B is a corresponding wavevector diagram.

FIG. 4A schematically illustrates an exemplary waveguide with core 419, diffractive elements 415, and cladding layers 411. An input optical signal (represented by arrow 403) may be optically coupled to a loss optical mode (represented by arrow 407) that propagates along the waveguide. The loss optical mode 407 in this example counterpropagates relative to the signal optical mode 403; a loss mode could also copropagate. Typically, the signal mode 403 is constrained to propagate within and adjacent to the core layer 419, while the loss mode 407 may propagate anywhere within the composite structure of the core and cladding, in many cases with significant fractions of its intensity localized at positions outside the core layer 419. FIG. 4B shows a propagation vector diagram that may be used to determine when strong coupling between signal mode and the loss mode may occur. The propagation vectors are defined as in the discussion of FIG. 3B, except that in this example $k_{loss}^P \equiv 2\pi n_{loss}/\lambda_{loss}$, where the effective refractive index $n_{loss}$ will be characteristic to the particular core and cladding structure and the specific loss mode under consideration. For many cladding modes, $n_{loss}$ and $n_{ext}$ differ, since the loss mode is substantially confined and its propagation properties are typically affected by details of the core and cladding geometry. The loss coupling coefficient, $\gamma(L)$, can be written in the same form as Eq. (1) but with $k_{loss}^P \equiv 2\pi n_{loss}/\lambda_{loss}$.

Loss Reduction

By means of adaptations disclosed herein, it is possible to preserve the functionality of a diffractive element set of a planar optical waveguide while substantially reducing optical coupling between at least one signal optical mode and at least one loss optical mode, or a range of optical loss modes. Reduction of optical coupling to loss optical modes is accomplished by appropriate design and fabrication of the planar optical waveguide and diffractive elements thereof so that signal and loss modes experience differential changes in effective index of refraction as a function of position among the diffractive elements of the planar waveguide. As discussed in the context of Eq. (1), coupling to loss modes is strongest when scattering occurs with a constant phase differential between signal and loss modes throughout the length of the diffractive element set. Differential control of effective modal indices may enable variation of the phase differential between signal and loss modes so as to reduce or substantially eliminate modal coupling and concomitant optical power loss. This may be done in conjunction with controlled placement of diffractive elements so as to maintain the desired spectral transfer function of the diffractive element set.

The effectiveness of adaptations disclosed herein for reducing optical coupling between signal and loss modes is predicated upon the ability to differentially modify the propagation properties of the signal and loss modes as a function of position within the diffractive element set. Referring to FIGS. 3A and 4A, it may be seen that controlled changes to the signal mode effective index $n_{sig}$ may be made that change the effective index of one or more loss modes to a substantially lesser extent, thereby providing differential control over respective signal and loss modal propagation properties. Methods of differentially controlling the signal mode effective refractive index as a function of position along the propagation direction may include but are not limited to: introducing position dependence into the bulk refractive index of the core layer by spatially varying its composition, or by using a uniform core layer composition and applying spatially varying UV radiation, other electromagnetic radiation, particle beam, electron beam, or other means. Alternatively, the effective refractive index of the signal 11 mode may be spatially varied by introducing spatially varying waveguide morphology. Such spatially varying waveguide morphology may comprise variations in core layer thickness, width (for a channel waveguide), density of diffractive elements, spatial profile of diffractive elements, or diffractive order of diffractive elements. In yet another approach to differentially controlling the effective refractive index of the signal mode, the core layer structure may be varied as a function of position, e.g. by introducing additional materials or structures within or near to the core layer.

Instead of preferentially altering the effective refractive index of the signal mode(s), the effective index of loss mode(s) may be targeted instead. The effective refractive index of a cladding loss mode (as schematically illustrated in FIG. 4A) may be differentially controlled as a function of position by introducing spatial variation in the bulk refractive index of the cladding material ($n_{ext}$) via variation of material composition or spatially dependent exposure to UV radiation, other electromagnetic radiation, particle beam, electron beam, or other means. Alternatively, spatial variation in the loss mode effective refractive index may be introduced by spatially varying structure or morphology of the cladding. For example, a spatially dependent variation of the cladding thickness or the nature of materials overcoating the cladding layer may be employed. The effective refractive index of loss modes may be made complex through the addition of absorptive materials within or on the surface of the cladding structure. Such absorptive material may be optimally positioned exclusive of regions wherein the signal mode has significant amplitude. Addition of an imaginary part (i.e., absorptive component) to the loss mode effective refractive index damps the loss mode rather than shifts its phase. Both damping and phase shifting of the loss mode field yield results of a similar nature, that is, reduction of the extent of optical coupling between the signal and loss modes. Damping reduces the extent to which loss mode fields arising from various positions within the diffractive element set may add coherently (i.e. constructively interfere) and thus provide substantial optical coupling between signal and loss modes.

Many mechanisms are known in the art to perturb or change the effective refractive index of optical fields propagating within or in proximity to waveguides. Application of any of those mechanisms known in the art to alter effective refractive indices so as to produce spatially dependent differential control between signal and loss mode effective indices may be utilized in applications of the present invention.

To retain the original spectral filtering properties of the diffractive element set, the designed optical spacing between adjacent diffractive elements should be substantially preserved. As described in more detail below, this may be accomplished by altering the physical separation between diffractive elements so as to maintain the designed optical separation despite any alterations in signal mode effective refractive index. In some cases, some of the original designed set of diffractive elements may be deleted in the course of implementing structural or morphological spatial variation to differentially modify loss and signal mode effective indices. When this is done, diffractive elements to be deleted may be selected so as to reduce or minimize the impact on the spectral response of the diffractive element set within its desired operational bandwidth. This is illustrated in various examples set forth hereinbelow.

General Loss Coupling Considerations

Suppose a diffractive element set having a designed spectral transfer function is desired, and that the designed spectral transfer function is produced when adjacent diffractive contours defining the diffractive elements have the optical path length separation specified by the design function $\delta s^D(z)$. The relation between the design function $\delta s^D(z)$ and the spectral transfer function of the resulting diffractive element set is known in the art. For a weakly diffracting set of elements, the spectral transfer function is may be obtained by Fourier transform of $\delta s^D(z)$. For a strongly diffracting set of elements, more advanced computational or analytical techniques must be brought to bear to relate $\delta s^D(z)$ to the spectral transfer function. For a simple, non-apodized diffractive element set, $\delta s^D(z)$ may be a constant. Whether the design function $\delta s^D(z)$ is constant or not, the physical spacing between contours defining adjacent diffractive elements is given by $$\Lambda(z) = \delta s^D(z)/n_{sig}(z) \quad \text{Eq. (2)}$$

In the course of reducing unwanted coupling between a signal optical mode and a loss optical mode, spatial variation in $n_{sig}$ as a function of z may be introduced. To preserve a desired spectral transfer function defined by the design function $\delta s^D(z)$, spacing between adjacent diffractive elements may be adjusted according to Eq. (2). In principle any desired design function may be preserved by fabricating the diffractive element set with the physical spacing between adjacent diffractive element set given by Eq. (2). The physical content of Eq. (2) is that the physical spacing of adjacent diffractive elements is adjusted in a manner inversely proportional $n_{sig}(z)$ so as to substantially maintain the optical path difference between adjacent diffractive elements at the design values. Application of Eq. (2) may enable a designer to adjust both $\Lambda(z)$ and $n_{sig}(z)$ so as to reduce coupling between signal and loss modes without compromising desired spectral transfer functions of the diffractive element set. In some cases, subsets of diffractive elements may be deleted to accommodate the differential spatial variation of signal and loss modal indices. Such deletions, if needed, may be made so as to minimize the impact on the spectral transfer function within the operational bandwidth of the device.

Eq. (1) may be generalized to the case where $n_{loss}$ or $n_{sig}$ varies as a function of z, thereby enabling evaluation of the coupling coefficient $\gamma$ as a function of propagation distance z through the diffractive element set. Specifically, the loss coupling coefficient may be written as $\gamma(z)$, with z varying between z=0 and z=L through the length of the diffractive element set. With the effective refractive indices varying with z, the various propagation vectors also vary with z, and must be written as: i) $K_\Lambda(z) = 2\pi/\Lambda(z)$; ii) $k_{sig}(z) = 2\pi n_{sig}(z)/\lambda_{sig}$; and iii) $k_{loss}^P(z) = 2\pi n_{loss}(z) \cos\theta/\lambda_{loss}$ (for a substantially unconfined loss mode, as in FIG. 3A), or $k_{loss}^P(z) = 2\pi n_{loss}(z)/\lambda_{loss}$ (for a substantially confined loss mode, as in FIG. 4A). The propagation vector mismatch becomes position dependent as well, i.e. $\Delta k(z) = K_\Lambda(z) - (k_{sig}(z) + k_{loss}^P(z))$, and Eq. (1) may be generalized and rewritten as $$\gamma(z) \propto \left| \int_0^z \alpha_0(z') \exp(i\varphi(z')) dz' \right|, \quad \text{Eq. (3)}$$

$$\text{with } \varphi(z') = \int_0^{z'} \Delta k(z'') dz'' \quad \text{Eq. (4)}$$

being the phase differential between signal mode and loss mode as a function of propagation distance through the diffractive element set. The loss coupling coefficient for the entire diffractive element set is obtained from Eq. (3) by inserting z=L. To those familiar with the art, it may be seen from Eq. (3) that the magnitude of optical coupling between a signal mode and a particular loss mode may be reduced or substantially nulled by controlled variation of $\Delta k$ as a function of position z. Physically, spatial variation of $\Delta k$ creates a spatial variation of signal mode—loss mode relative phase along with a concomitant reduction of coherent scattering amplitude. There are any number of ways that $\Delta k$ can be made to vary with respect to z that may reduce or substantially null the magnitude of optical coupling between the signal mode and the loss mode, and any such way shall fall within the scope of the present disclosure or appended claims. Optimally, $\Delta k(z)$ should exhibit variations large enough so that $\Delta k_m L \geq \pi$, where $\Delta k_m$ is the mean magnitude of $\Delta k(z)$ averaged over the length L of the diffractive element set. This last expression is approximate and reflects the need for aggregate phase differentials between the signal and loss mode of order $\pi$ or greater over the length of the diffractive element set. Smaller aggregate phase changes typically result (in single pass devices) in limited destructive interference between optical fields coupled into the loss mode from different spatial portions of the diffractive element set, resulting in a lesser reduction of coupling between signal and loss modes than might have otherwise been achieved. Nevertheless, if such lesser reduction of coupling is operationally acceptable, such smaller phase shifts may be employed.

The effect of adding absorptive material to control loss mode loss is not explicitly accounted for in Eq. (3) as written. Its effect, rather, is to effectively reduce the span of the integral to a length determined by the cladding field damping length. Effectively, the loss-mode field is then generated by multiple shorter diffractive element sets (each having a length given by the field damping length) which do not yield the same level of cooperative enhanced loss as the full diffractive element set without loss-mode damping.

When multiple loss modes exist and their propagation vectors occupy a range of finite values, $\Delta k_{loss}^P$, reducing unwanted optical coupling between the signal optical mode and each of the loss modes may be achieved according to the present disclosure. In such a case, it may be desirable to use propagation vector mismatches of significantly larger magnitude ($\Delta k_m L >> \pi$), so that many variously signed $\pi$-magnitude phase shifts between signal and loss modes may be introduced for each signal/loss mode pair along the length of the diffractive element set.

Means for Determining $\Delta k(z)$

In the exemplary embodiments illustrated schematically in FIGS. 5-9 and 11, adaptations of the waveguide preferentially influence the effective index of signal mode(s). The effective index of loss mode(s) would be effected to a lesser or negligible extent. In FIGS. 5-8, both freely propagating loss modes (as in FIG. 3A) and confined loss modes (as in FIG. 4A) may be present.

Figure 5:
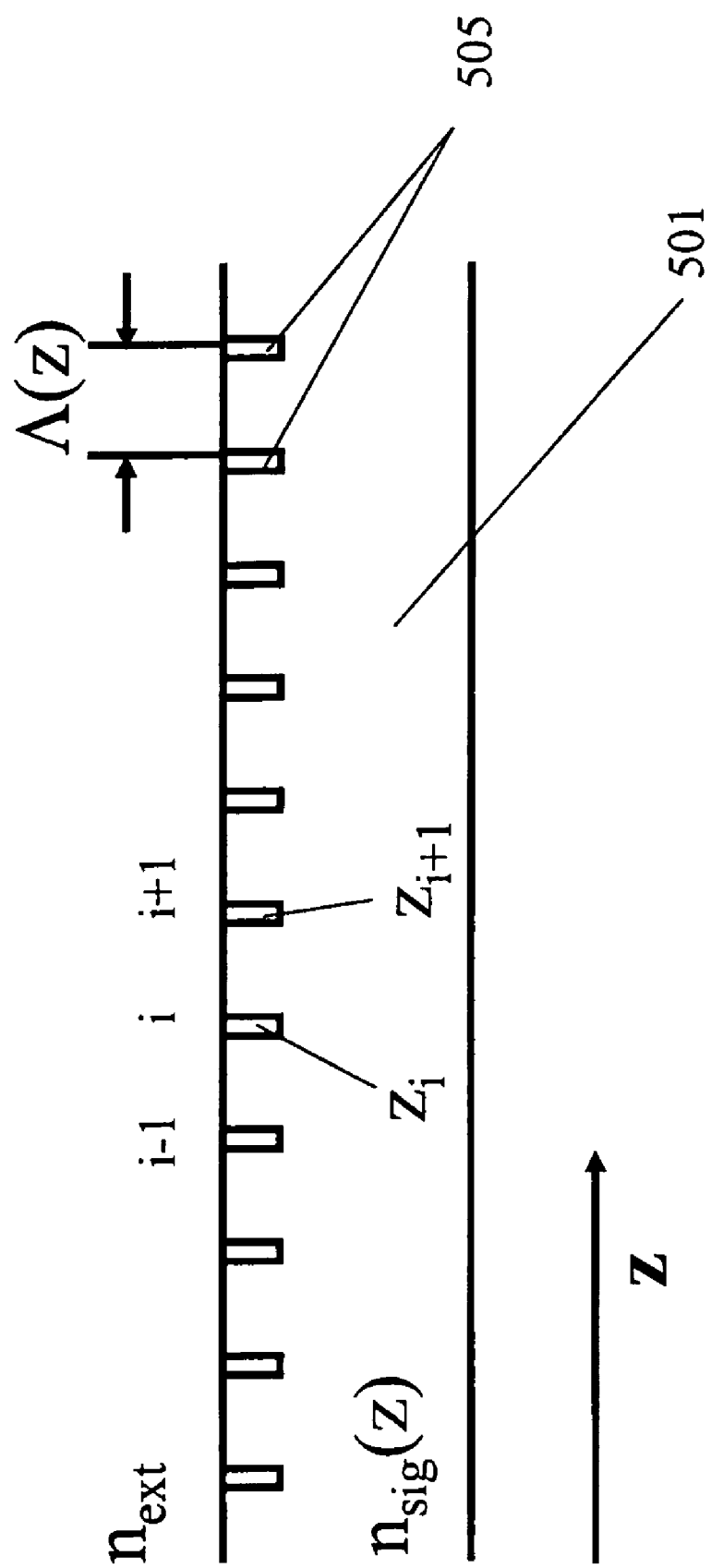
FIG. 5 is a schematic cross-section of an exemplary optical waveguide with a set of diffractive elements.

FIG. 5 schematically illustrates an exemplary planar waveguide with a core layer 501 and diffractive elements 505. In this example the spatial variation of $n_{sig}(z)$ and hence $\Delta k(z)$ is determined by the spatial variation of the bulk index $n_{core}(z)$ of the core material. In order to preserve a designed spectral transfer function of the distributed Bragg reflector, the spacing $\Lambda(z)$, is adjusted according to Eq. (2), where the dependence of $n_{sig}(z)$ is derived from the applied variation in $n_{core}(z)$ and the waveguide geometry according to methods known in the art. Spatial variation of $n_{core}(z)$ gives rise to spatial variation of $n_{sig}(z)$, in turn giving rise to spatial variation of $\Delta k(z)$. By controlling during fabrication the compositional or physical changes giving rise to $n_{core}(z)$, a desired function $\Delta k(z)$ may be obtained.

Figure 6:
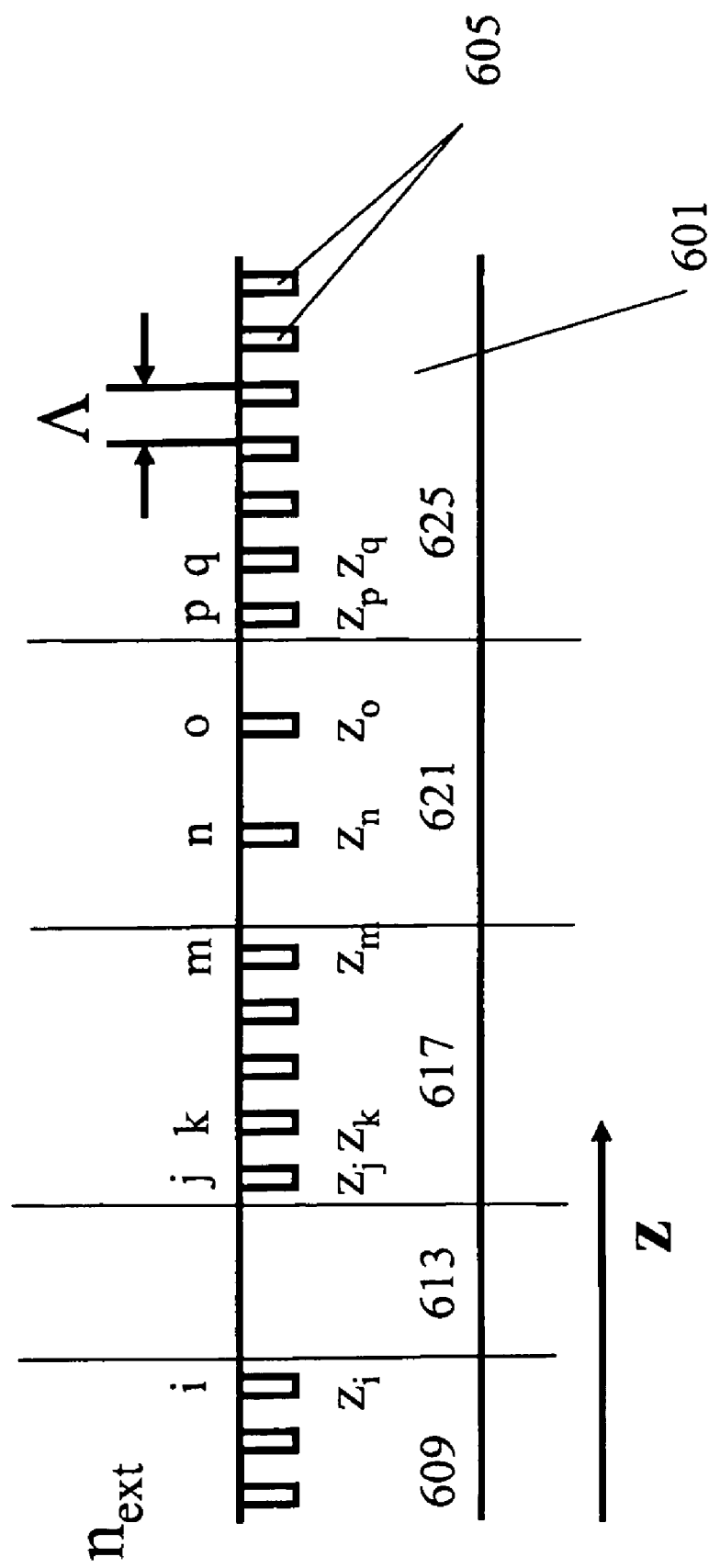
FIG. 6 is a schematic cross-section of an exemplary optical waveguide with a set of diffractive elements.

FIG. 6 schematically illustrates two exemplary morphological approaches for controlling $n_{sig}(z)$ and hence $\Delta k(z)$. A core waveguide layer 601 is shown with diffractive elements 605. In each of regions 609, 617, and 625, the diffractive elements 605 form a substantially uniform first-order diffractive structure, and $n_{sig}$ has the same substantially constant value in each region. In region 613, diffractive elements are absent, resulting in a different value for $n_{sig}$. The absence of diffractive elements in region 613 results in a different value for $n_{sig}$ (since the waveguide properties are altered) and hence $\Delta k$. In region 621, diffractive elements 605 form a substantially uniform second-order diffractive structure. Once again, the change in diffractive element spatial density results in a different value for $n_{sig}$ and hence $\Delta k$. Spatial variation of the spatial density of diffractive elements (perhaps including absence of diffractive elements from one or more regions of that portion of the planar waveguide occupied by the diffractive element set) provides means for introducing a controlled position dependence into $\Delta k(z)$. In introducing a region such as region 613 without 11 diffractive elements, or a region such as region 621 with a reduced number of diffractive elements, some diffractive elements of an originally complete first-order diffractive structure are necessarily absent. Optical design methods known in the art may be employed to control the number and position of missing diffractive elements so as to leave the spectral transfer function of the diffractive element set substantially intact (within operationally acceptable limits) over its operational bandwidth. Physical spacing between the diffractive elements that are present may be adjusted to compensate for the absence of other diffractive elements so as to preserve the corresponding design optical pathlengths $\delta s^D(z)$.

The approaches illustrated in FIG. 6 may be readily implemented in a planar waveguide having two or more interleaved diffractive element sets, for example in devices wherein multiple interleaved diffractive element sets contribute to the overall device function as in a multiplexer or demultiplexer. When diffractive element sets are interleaved (as disclosed in above-cited application Ser. No. 10/998, 185), each set is divided into spatial segments and the segments of the various diffractive element sets may be arranged one after another along the signal propagation direction in a designed ordering. In addition to design considerations disclosed in application Ser. No. 10/998,185 (in which the effect of the particular interleaving arrangement on the resulting spectral transfer function is taken into account), a particular interleaving arrangement may be chosen that reduces unwanted coupling to loss modes according to the present disclosure.

Figure 7:
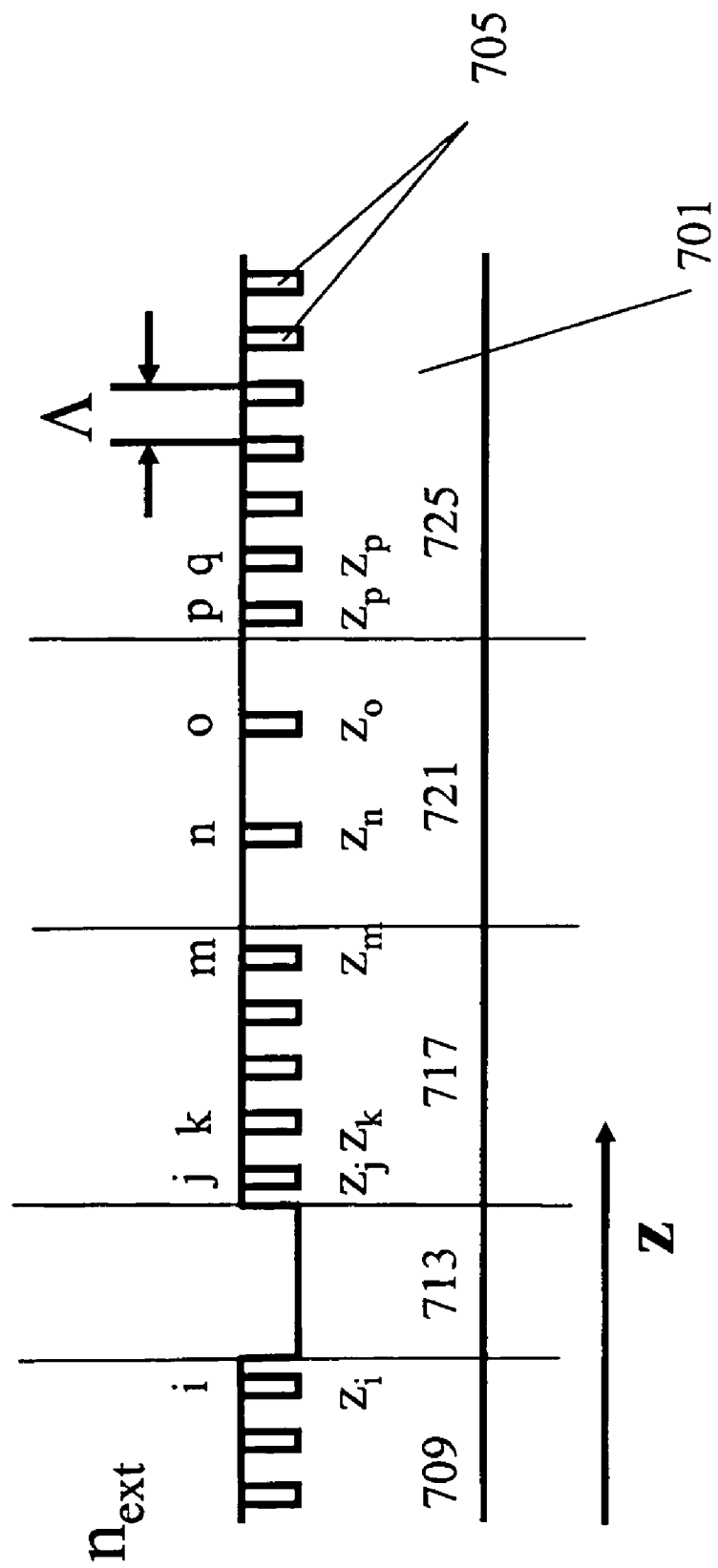
FIG. 7 is a schematic cross-section of an exemplary optical waveguide with a set of diffractive elements.

In the exemplary embodiment schematically illustrated in FIG. 7, a region 713 normally having diffractive elements 713 may be etched away (and perhaps subsequently filled with cladding material), thereby altering $\Delta k$ in region 713. Spatial regions 709, 717, 721, and 725 have diffractive elements 705 of varying spatial density in a manner similar to that described for FIG. 6. Spatial intervals between diffractive elements are modified as necessary to preserve the design set of optical spacings $\delta s^D(z)$. In making gap of region 713 as shown in FIG. 7, some diffractive elements may be completely eliminated, or may be only partly eliminated (for example, if the etch depth is less than that used to initially form the diffractive elements 705. The depth of the etch in region 713 may be the same as or different from the etch depth(s) used for forming the diffractive elements 705.

Figure 8:
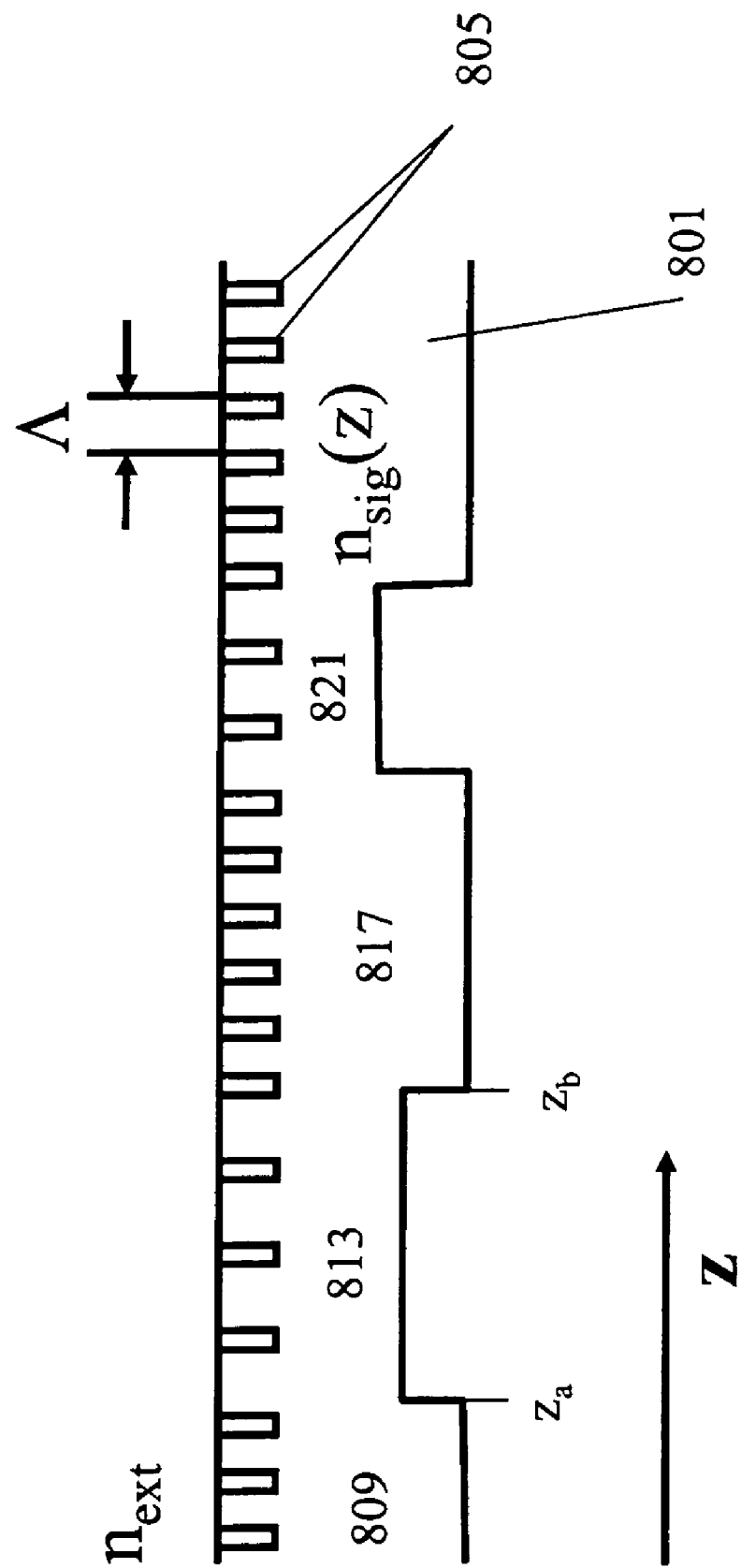
FIG. 8 is a schematic cross-section of an exemplary optical waveguide with a set of diffractive elements.

FIG. 8 schematically illustrates an exemplary planar optical waveguide core 801 having spatially varying thickness along the direction of optical signal propagation. In this example the core thickness is varied by fabrication of local regions of lower cladding material 802 extending upward into the core layer 801. Such fabrication may be achieved in a variety of ways, e.g. by a preliminary mask and etch of the lower cladding material followed by deposition of the core material. Alternatively, the lower surface of the core layer itself could be etched provided that the lower cladding is to be applied subsequently or provided that the lower cladding comprises vacuum, air, or other ambient atmosphere.

Many means are known in the art to make position dependent changes in the spatial boundaries of a planar optical waveguide core (upper and lower boundaries for channel and slab waveguides; lateral boundaries as well for channel waveguides). Any suitable method may be employed for introducing a desired variation of $\Delta k$ with position within the diffractive element set of a planar optical waveguide. To achieve a desired spectral transfer function for the diffractive element set, the physical spacing of diffractive contours is determined substantially according to Eq. (2). Any variation in the morphology of the core or diffractive elements of the planar optical waveguide as a function of position along the direction of optical signal propagation leads to a position-dependent change in $n_{sig}$ and hence $\Delta k$. Note that the spacing $\Lambda$ may change from one core waveguide morphology region to another, depending on the local waveguide morphology.

It may also be desirable to create gradual, substantially adiabatic transitions between planar waveguide segments having differing propagation properties, so as to reduce impedance mismatch losses between the dissimilar regions of the waveguide. Many methods of implementing such adiabatic transitions are known in the art, including such examples as tapered transitions and diffusion-based spreading of core or cladding dopants. In slab waveguide structures, transitions across the boundaries may also be tapered by controlling the line of interface between slab waveguide regions. Any such adiabatic adaptations may be implemented within the scope of the present disclosure or appended claims.

Figure 9:
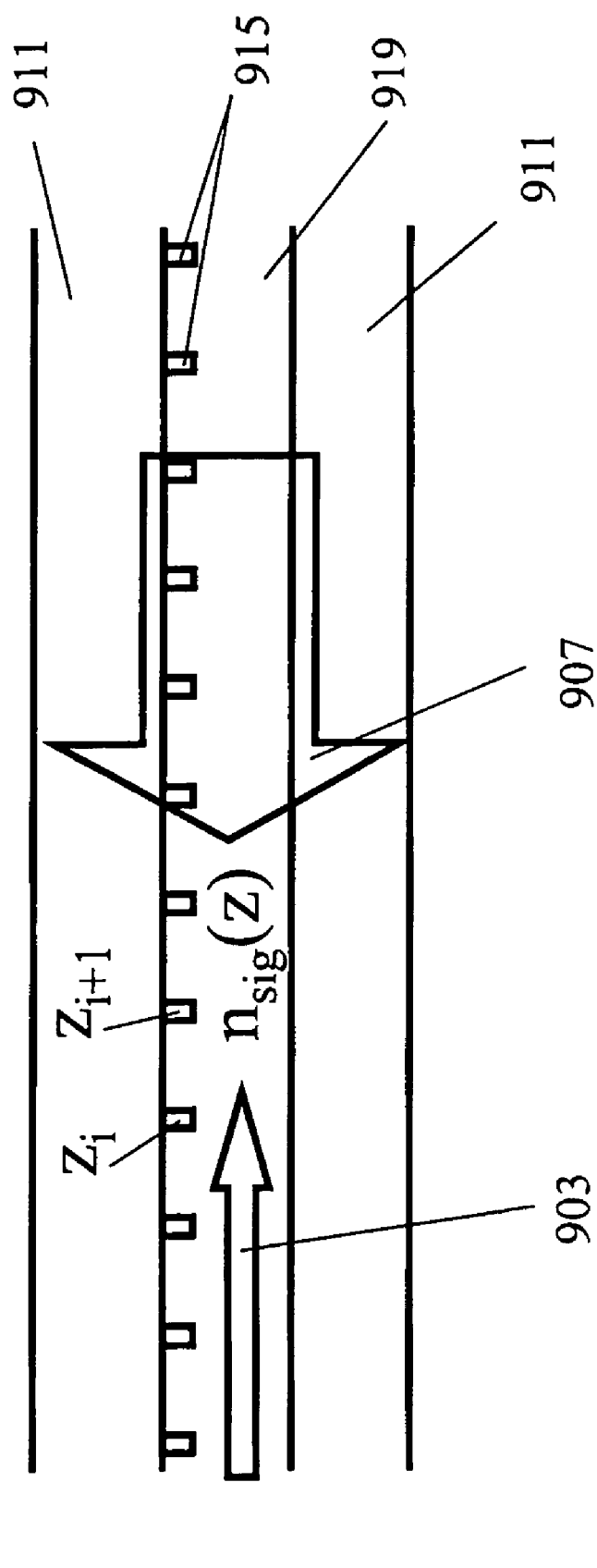
FIG. 9 is a schematic cross-section of an exemplary optical waveguide with a set of diffractive elements.

FIG. 9 illustrates schematically an exemplary planar optical waveguide with core 919, cladding layers 911, and diffractive elements 915. A signal mode (represented by arrow 903) propagates substantially within the core 919, while a cladding-type loss mode (represented by arrow 907) propagates along the planar waveguide localized mainly in the cladding layers 911. While both signal and cladding optical modes typically have optical power flowing along both core and cladding, the preponderance of the signal mode power is localized in the core, and a preponderance of the loss mode power is localized in the cladding. As already disclosed herein, the effective refractive index of the signal mode $n_{sig}$ is made position dependent predominantly through designed spatial variation of the core layer bulk refractive index $n_{core}$, by spatial variation of the waveguide core structure (including the core/cladding interface), or by spatial variation of the density of diffractive elements. The effective refractive index of the loss mode $n_{loss}$ may also be affected by these adaptations of the waveguide core (particularly structural alterations of the core/cladding interface), but since the loss mode lies predominantly in the cladding layers, these adaptations may typically preferentially affect the signal mode effective index $n_{sig}$. Concurrent with the spatial variation of $n_{sig}(z)$, the physical spacing of the diffractive elements $\Lambda(z)$ may be modified in accordance with Eq. (2) to preserve a design spectral transfer function for the signal mode.

Figure 10:
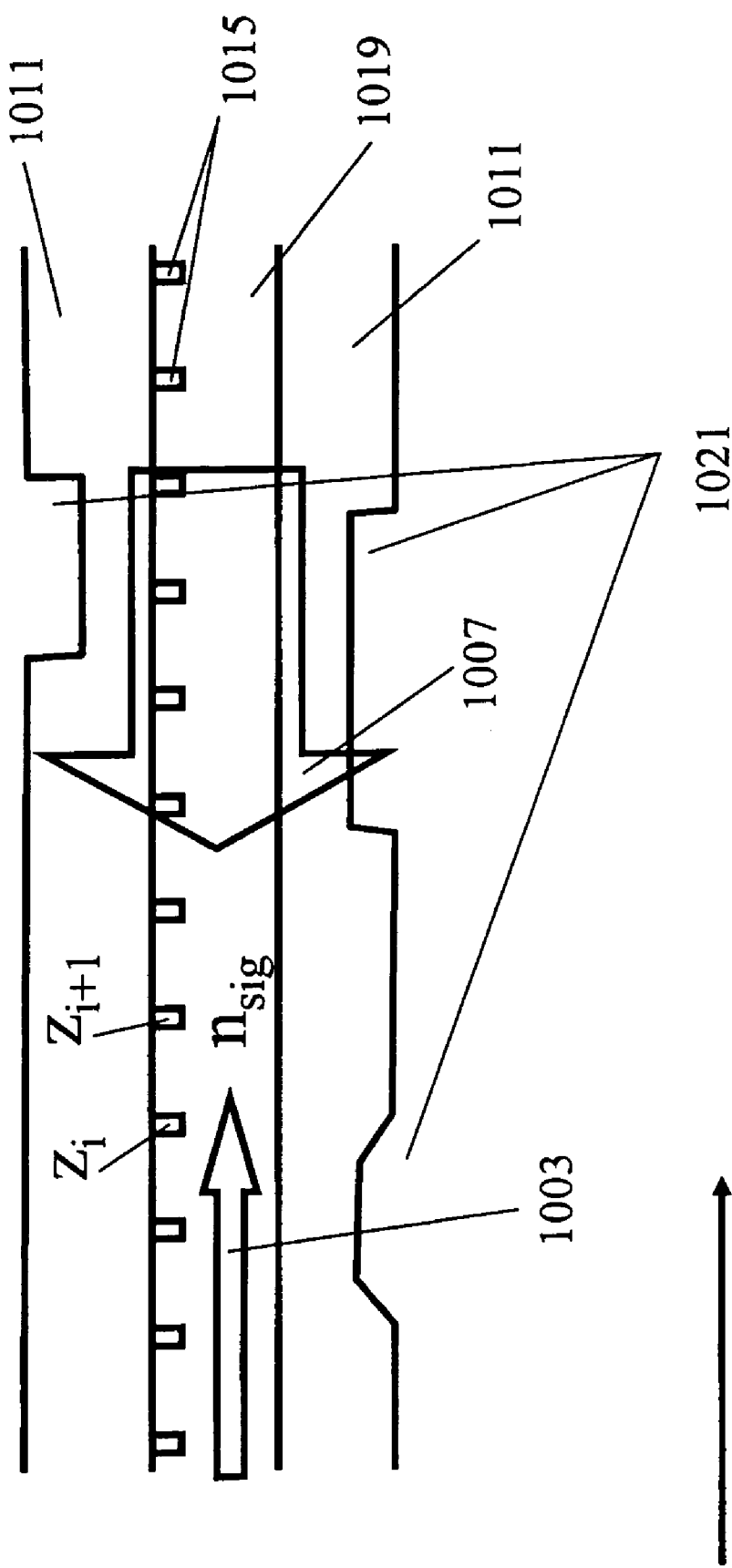
FIG. 10 is a schematic cross-section of an exemplary optical waveguide with a set of diffractive elements.

In the exemplary embodiments of FIGS. 5-9, the adaptations of the planar waveguide and diffractive elements thereof are assumed to primarily affect the propagation properties of the signal mode, while leaving the loss mode relatively unchanged. The opposite situation is schematically illustrated in the exemplary embodiment of FIG. 10. A signal optical mode (represented by arrow 1003) propagates predominantly within the core layer 1019 and interacts with diffractive elements 1015. A cladding-type loss mode (represented by arrow 1007) propagates along the planar waveguide predominantly localized in the cladding layers 1011. The effective refractive index of the cladding-type loss mode is made spatially dependent by spatially varying structural alterations of one or both outer cladding layer surfaces (in the form of indentations 1021 in this example. Such structural alterations may preferentially alter the effective index $n_{loss}(z)$, while yielding little or no change in the signal effective index $n_{sig}(z)$. Since $\Delta k(z)$ depends on both $n_{sig}(z)$ as well as $n_{loss}(z)$ the cladding modifications shown in FIG. 10 provide a means for implementing a controlled spatial variation of $\Delta k(z)$.

Figure 11:
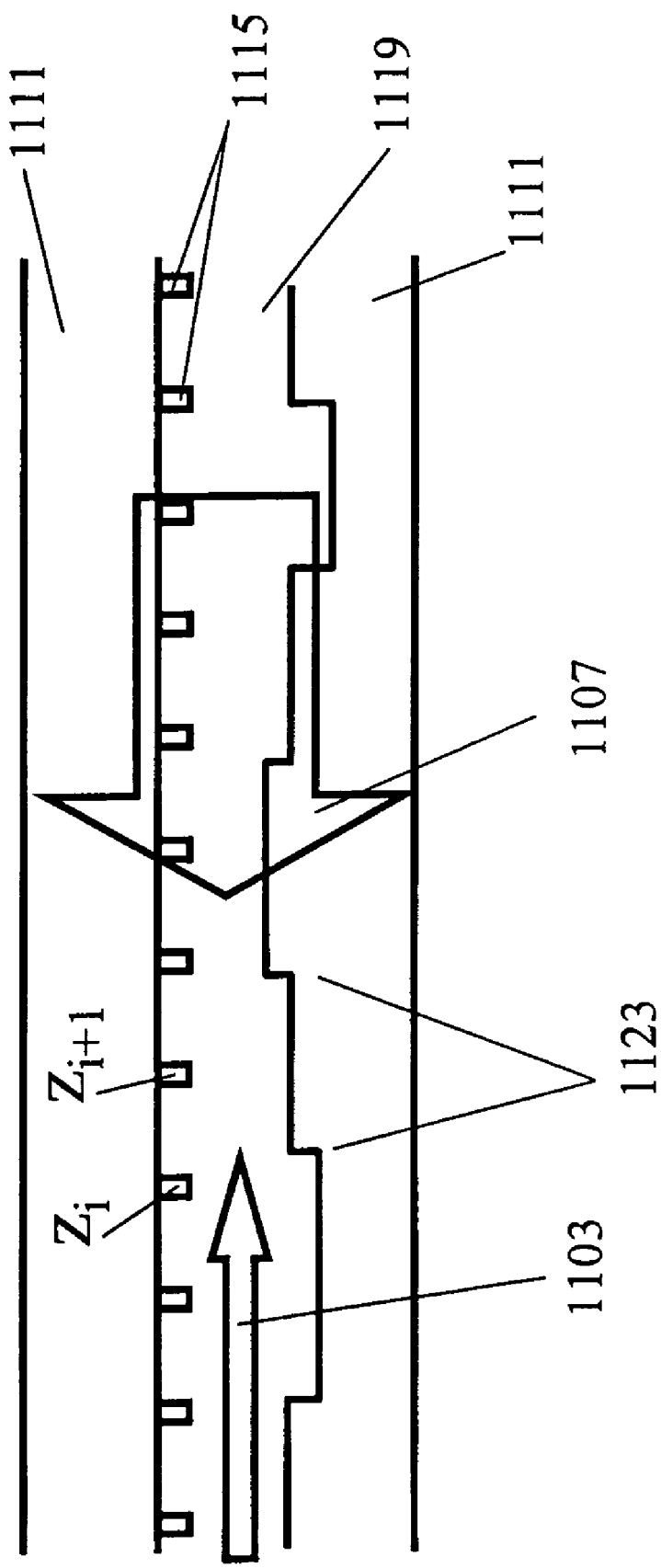
FIG. 11 is a schematic cross-section of an exemplary optical waveguide with a set of diffractive elements.

In the schematic illustration of the exemplary embodiment of FIG. 11, spatially varying structural features 1123 of the core/cladding interface may typically yield differing spatial variations of the effective refractive indices of the signal mode (represented by arrow 1103) and a cladding-type loss mode (represented by arrow 1107). Suitable design of the spatially varying core/cladding interface enables implementation of a desired position dependence for $\Delta k(z)$. Such structural features may be formed by any suitable fabrication method, including those disclosed herein and in the various cited references.

As already described hereinabove for the core layer, a position-dependent bulk refractive index of the cladding layer $n_{ext}(z)$, preferentially affecting the cladding modal index $n_{loss}(z)$, may provide yet another means for implementing a desired position dependence for $\Delta k(z)$. Any suitable fabrication method may be employed for forming the spatial variation of $n_{ext}(z)$, including those disclosed herein and in the various cited references.

Figure 12:
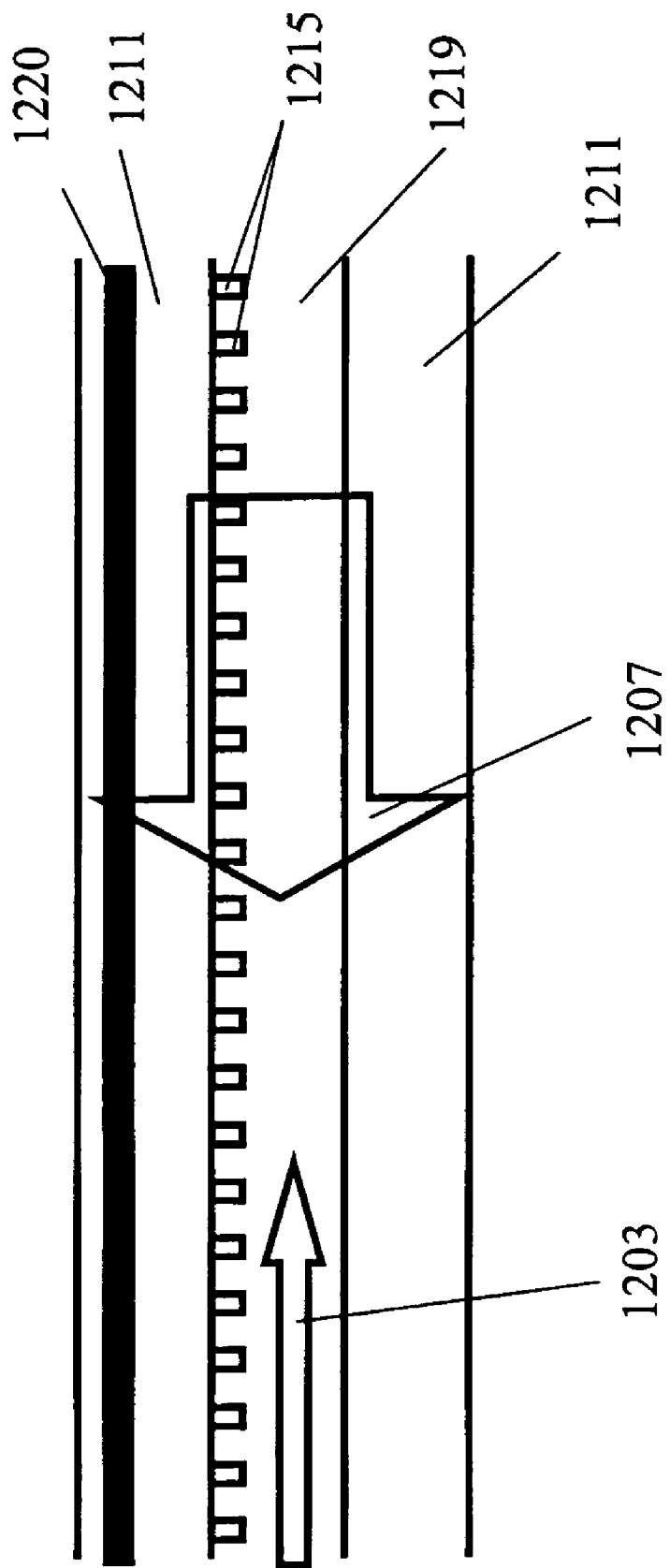
FIG. 12 is a schematic cross-section of an exemplary optical waveguide with a set of diffractive elements.

FIG. 12 illustrates schematically an exemplary planar waveguide comprising a core layer 1219, cladding layers 1211, diffractive elements 1215, and a dissipative layer 1220 in one of the cladding layers. The dissipative layer 1220 depletes the field of the cladding-type loss mode (represented by arrow 1207) on a distance scale short relative to the overall length of the diffractive element set, thereby frustrating fully cooperative coupling between the signal mode (represented by arrow 1203) and the loss mode. The dissipative layer 1220 may comprise an absorptive layer (absorptive at the appropriate design wavelength) or a scattering layer.

Figure 19:
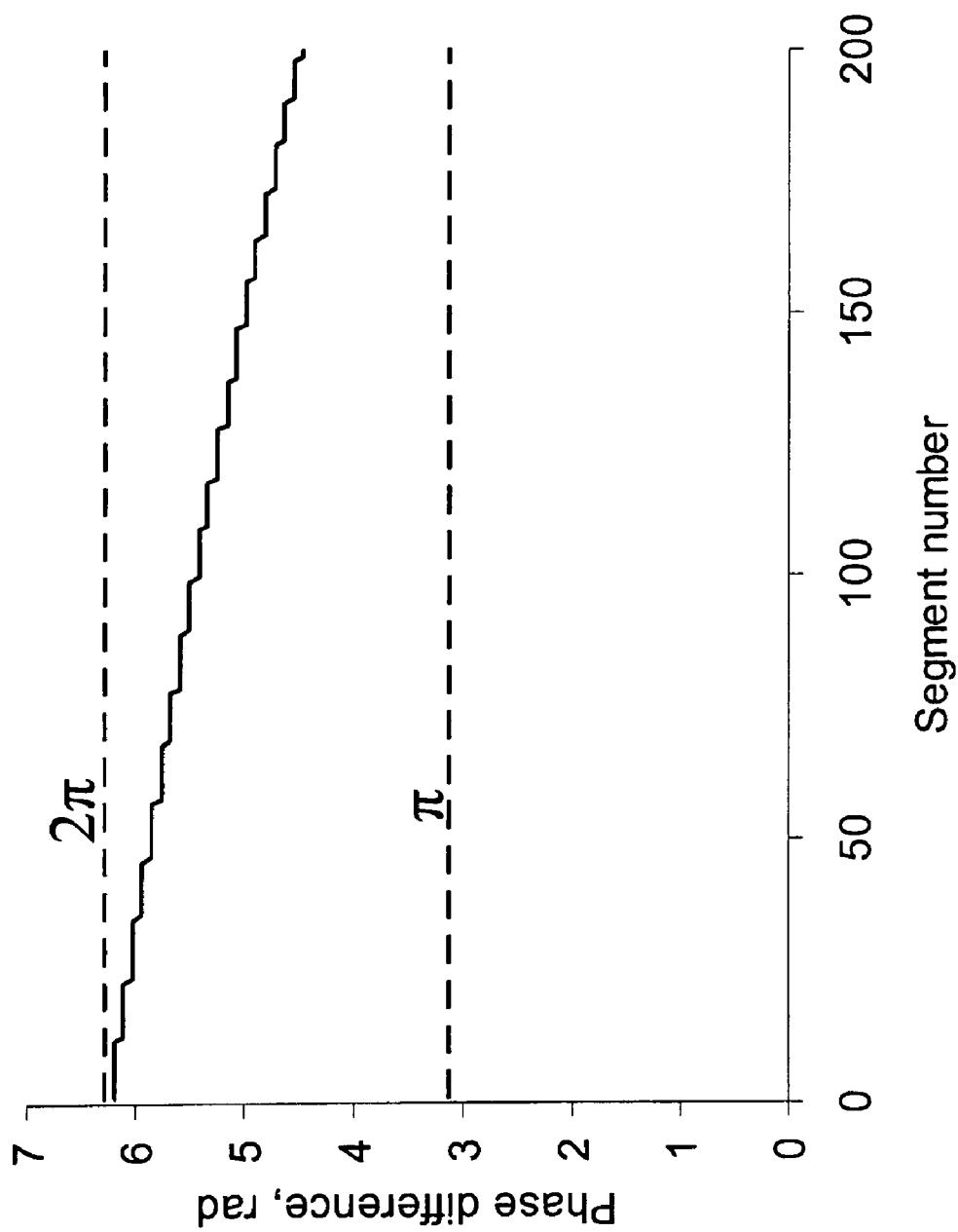
FIG. 19 shows the phase differences among diffractive elements subsets of the exemplary embodiment of FIG. 17B.

By means of any one or more of the adaptations disclosed herein for providing a spatially varying $\Delta k(z)$, one may readily define a particular spatial variation for reducing coupling between at least one signal optical mode and at least one loss optical mode according to Eq. (3). It should be noted that myriad spatial variations for $\Delta k(z)$ may be chosen that result in reduction or substantial elimination of optical coupling between signal and loss optical modes according to Eqs. (3) and (4). Examples may includes but are not limited to: random variation, monotonic variation, linear variation, oscillatory variation, periodic variation, or variation of other functional form. Such dependences may be substantially smooth, or stepwise (see for example FIG. 19, in which a substantially linear phase difference occurs in a stepwise fashion). Specific examples are disclosed herein, but any arrangement or adaptation with $\Delta k(z)$ yielding an operationally acceptable level of such optical coupling may be implemented within the scope of the present disclosure or appended claims.

Figure 13:
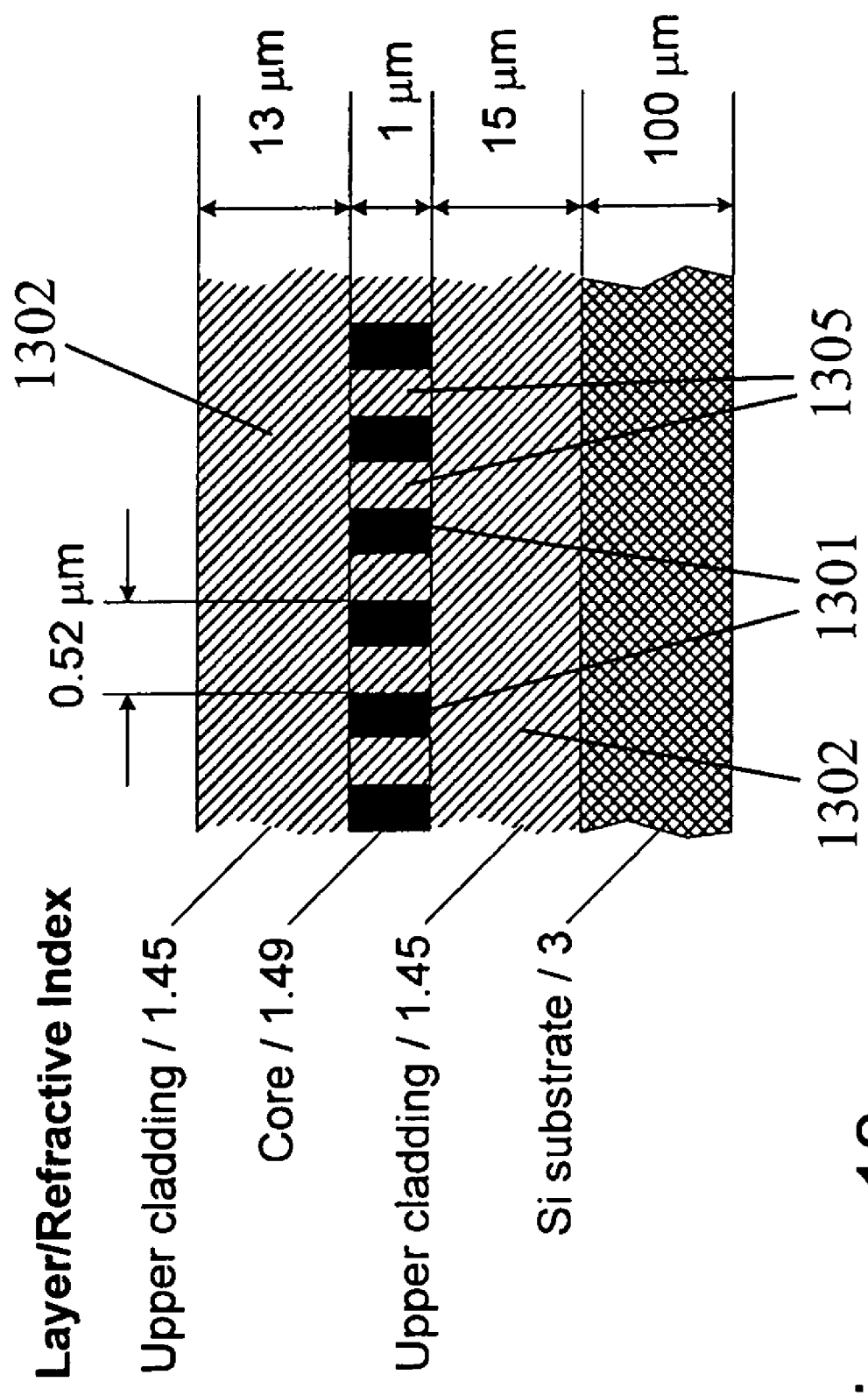
FIG. 13 is a schematic cross-section of an exemplary planar optical waveguide with a set of diffractive elements.

In the exemplary embodiment next described, adaptations disclosed herein are implemented in a specific way for suppressing optical coupling between signal and cladding optical modes in a diffractive element set formed in a silica-on-silicon slab waveguide. The waveguide cross-section with specific layer indices and thicknesses is shown in FIG. 13.

Figure 14:
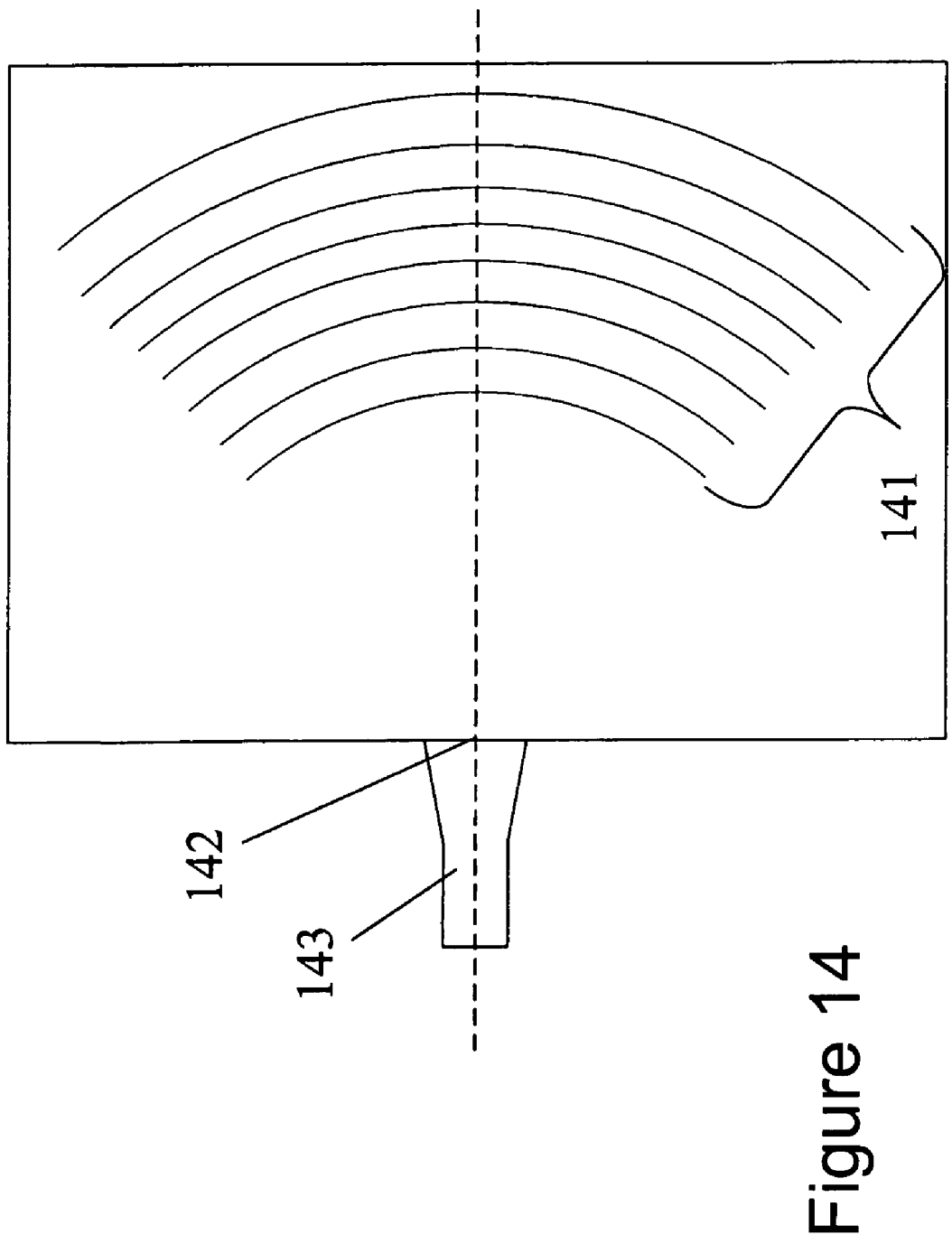
FIG. 14 is a schematic plan view of an exemplary planar optical waveguide with a set of diffractive elements.

First consider a reference diffractive element set formed in a slab waveguide designed without the adaptations for reducing coupling to loss optical modes, the slab waveguide comprising core layer 1301 between cladding layers 1302. The diffractive elements in this reference example are formed by etching through the core layer 1301 and filling the trenches 1305 with the cladding material, so that there are alternating regions filled with cladding and core material ("trenches" and "ribs", respectively, the trenches acting as the diffractive elements and the ribs acting as the waveguide core). The reference device has 6000 diffractive elements arranged with a substantially constant spatial period $\Lambda$ (width of one trench plus one rib) of 0.52 microns. The total length L of the reference device is L=3120 μm (accounting for 6000 trench and rib pairs). The width a of each trench is a=0.26 μm). A top view of the reference 2D diffractive element set is shown in FIG. 14. The contours 141 defining the diffractive elements are arcs with common center of curvature 142. Apertures of both input and output optical ports coincide with the center of curvature 142 so that light coupled into the device through a channel waveguide 143 and resonant with the diffractive element set is back diffracted by the diffractive elements to the same channel waveguide 143. The structure of the reference device is exemplary and the disclosed adaptations may be implemented with other arrangements or configurations of the planar waveguide (slab or channel), diffractive elements, contours, or optical ports.

The reference device supports a continuum of signal modes and loss modes in the slab plane, but only discrete modes in the direction perpendicular to the slab plane satisfying boundary conditions at the various core-cladding interfaces (referred to herein as perpendicular or transverse modes). The geometry of the diffractive elements substantially determines which of the modes in the slab plane are coupled; however, various perpendicular modes may exhibit unwanted coupling. In particular, the lowest-order perpendicular signal mode may be coupled to several perpendicular cladding (loss) modes. In the following, we use the term mode to specify modes defined by their variations along the direction perpendicular to the plane of the slab waveguide (i.e. perpendicular modes).

Figure 15:
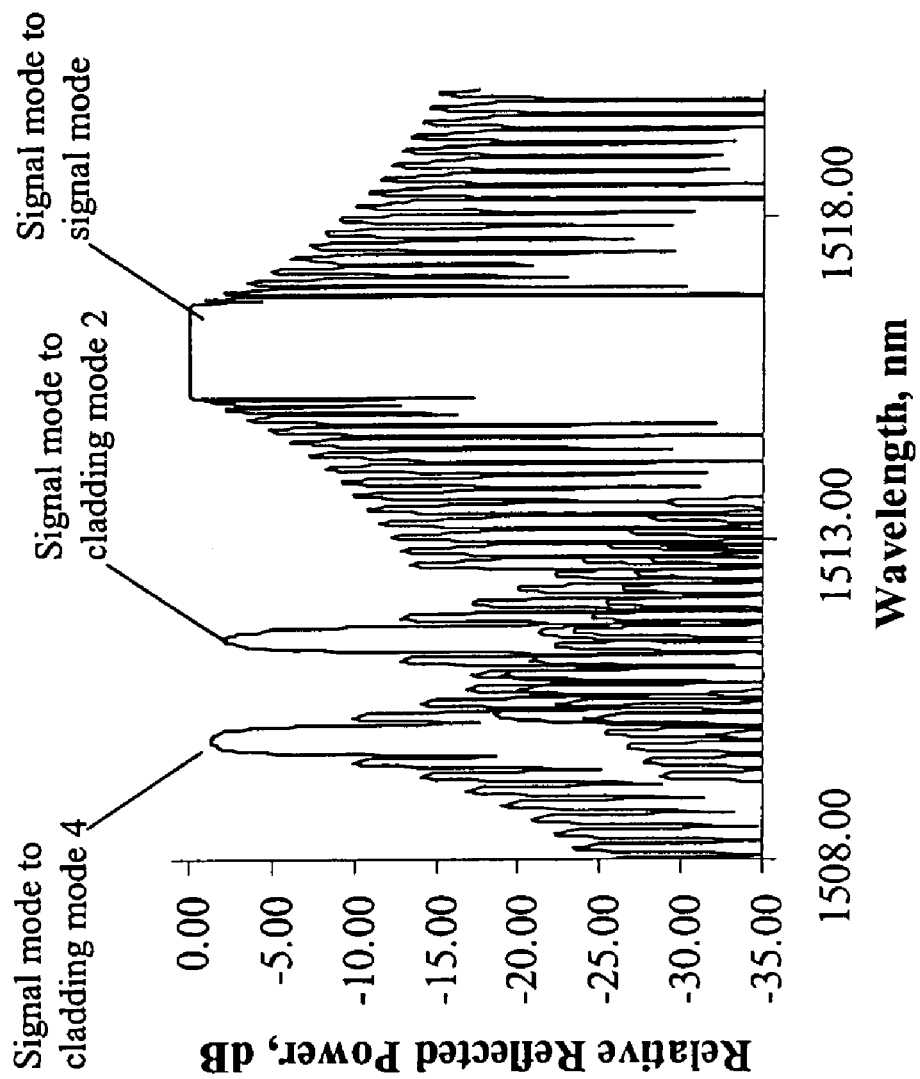
FIG. 15 illustrates spectral reflection profiles for an exemplary planar optical waveguide with a set of diffractive elements.

The effective refractive indices of the lowest signal mode and certain cladding (loss) modes in the reference diffractive element set in the slab waveguide are given in Table 1. The refractive indices may be calculated using standard commercial software or any other suitable means known in the art. In practice, such calculated results may require calibration to empirical measurements of actual devices. The vacuum wavelength of an optical signal resonant with the diffractive element set of the reference device signal mode is $\lambda_{res}$=1.52 μm. FIG. 15 shows a simulated reflective spectrum of the reference diffractive element set, with several reflective maxima representing coupling between various modes. The rightmost reflective maximum corresponds to backscattering of the lowest-order signal mode onto itself (presumably the desired optical coupling of the device). Reflective maxima to the left represent backscattering from the lowest-order signal mode to two of the cladding (loss) modes. It is apparent from FIG. 15 that optical signals blue-shifted relative to the device resonance wavelength may experience unwanted optical coupling to loss modes (i.e. may experience significant optical loss) as they propagate through the reference device. Since this may be generally undesirable, adaptations disclosed in the present disclosure may be implemented for reducing such optical loss. It may be observed in this example that optical coupling between the signal mode and symmetric cladding modes (2) and (4) is greater than such coupling to anti-symmetric cladding modes (1) and (3). The lowest-order signal mode is typically also coupled into other cladding modes and free-space modes in addition to those shown explicitly in FIG. 15.

TABLE 1

| Mode | Effective refractive index-regions with diffractive elements | Effective refractive index-regions without diffractive elements | Δn |
|---|---|---|---|
| Signal (0) | 1.458 | 1.474 | 0.016 |
| Cladding (1) | 1.449 | 1.449 | 0.000 |
| Cladding (2) | 1.449 | 1.449 | 0.000 |
| Cladding (3) | 1.447 | 1.447 | 0.000 |
| Cladding (4) | 1.446 | 1.446 | 0.000 |
| Cladding (5) | 1.443 | 1.443 | 0.000 |
| Cladding (6) | 1.441 | 1.442 | 0.001 |
| Cladding (7) | 1.436 | 1.437 | 0.001 |
| Cladding (8) | 1.434 | 1.435 | 0.001 |
| Cladding (9) | 1.429 | 1.430 | 0.001 |

Figure 16:
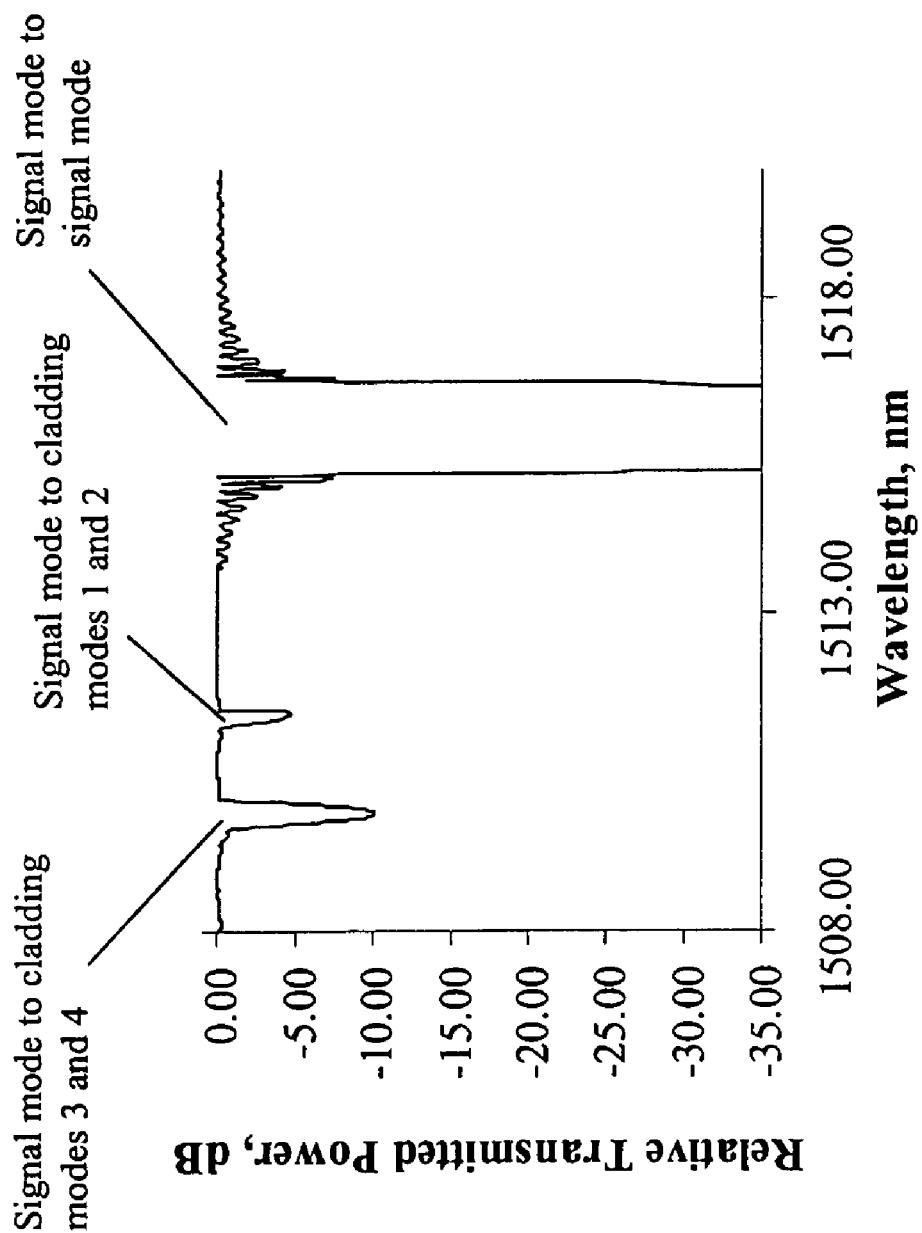
FIG. 16 illustrates a spectral transmission profile for an exemplary planar optical waveguide with a set of diffractive elements.

The wavelengths at which the signal mode is coupled into the various cladding modes will manifest themselves as loss peaks (inverted) in a transmission spectrum of the optical signal mode (FIG. 16). In the following discussion, adaptations implemented for reducing signal loss to the cladding modes are described. Specifically, the reference device is modified by deleting subsets of diffractive elements so as to form a series of waveguide segments wherein no diffractive elements are present. This may be accomplished by removal of previously formed diffractive elements from the device, or by not forming those diffractive elements during fabrication of the device. The absence of diffractive elements from waveguide segments differentially affects the effective refractive indices of signal and cladding modes ($n_{sig}$ and $n_{loss}$, respectively), thereby introducing a position dependent variation of Δk(z) as described herein. The arrangement of diffractive elements in the reference diffractive element set is shown in cross-section in FIG. 17A. FIG. 17B illustrates schematically in cross-section a diffractive element set adapted according to the present disclosure for reduced optical coupling between signal and cladding modes.

The second and third columns of Table 1 show the effective refractive indices of the lowest-order signal mode and selected cladding modes for slab waveguide regions with and without diffractive elements present. The forth column shows the difference between the effective indices of columns 2 and 3. It may be observed that the effective refractive index of the lowest-order signal mode is more sensitive than the cladding modes to the presence or absence of diffractive elements, by an order of magnitude or more.

The reduced-loss diffractive element set of FIG. 17B comprises 200 separate subsets of diffractive elements (subsets also referred to as segments). The diffractive element spacing, trench width, and rib width are constant within each subset, and are substantially equal to the original values of the reference device (Λ, a, and b, respectively). Each of the subsets of diffractive elements comprises a fixed integer number of trenches and ribs (21 trenches and 20 ribs in this example), so that the total length of the segments $L_{seg}$ is approximately 10.66 μm, except for the last segment that comprises 52 trenches and 51 ribs and whose length is approximately 26.49 μm. This latter length was chosen to preserve the approximate total length L of the diffractive element set, in turn preserving the bandwidth of the main reflection maximum for the signal optical mode. The segments of diffractive elements may be designated by a parameter q which runs from 1 to 200 and increases monotonically from the input end of the diffractive element set. The 200 segments of diffractive elements are separated by 199 spacer regions of varying lengths $L_{spacer}(q)$, from which diffractive elements are absent. For the spacer regions, the corresponding parameter q increases from the input end of the diffractive element set and runs from 1 to 199. Physical lengths of spacer regions, $L_{spacer}(q)$, are set so that their signal mode optical path lengths are equal to $L_{spacer}(q)$=b+ $p(q)\lambda_{res}/2n_{sig}$(spacer), where $n_{sig}$(spacer) is the effective refractive index of the signal mode in the spacer regions, and p(q) is a positive integer. If the spacer regions are arranged as described, light diffracted from the diffractive elements will constructively interfere at the resonance wavelength for the forward-propagating signal optical mode coupled into backward-propagating signal optical mode (as in the reference device of FIG. 17A), while interaction between the etched segments for other modes will be only partially constructive. In this example values of p(q) may be calculated as $$p(1)=1; \; p(q+1)=\text{fix}(1.002p(q)+0.08), \quad \text{Eq. (5)}$$

where fix(x) designates the largest integer smaller than the argument.

Figure 18:
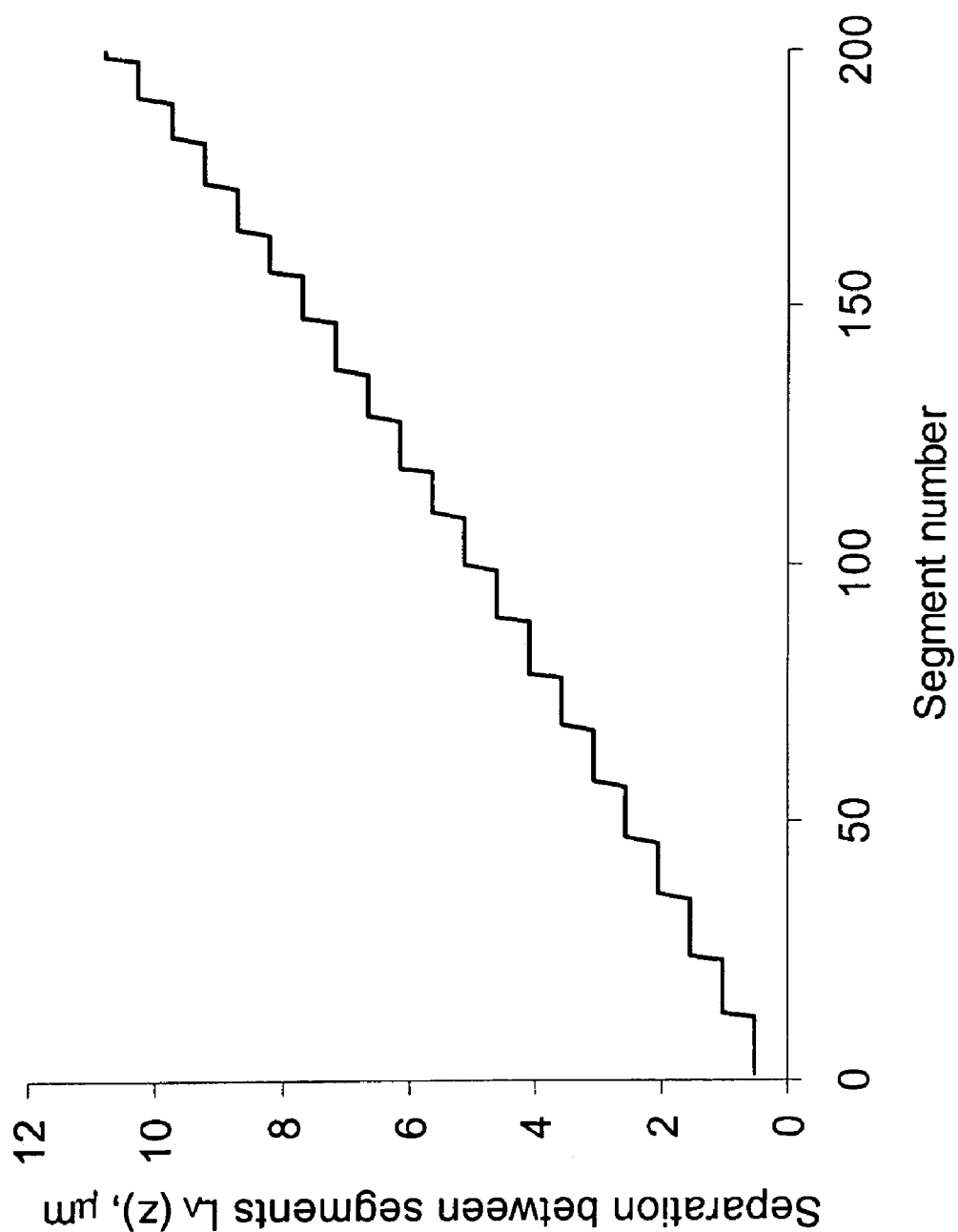
FIG. 18 shows the physical separation between diffractive element subsets of the exemplary embodiment of FIG. 17B.

The parameters of Eq. 5 have been chosen to spectrally chirp the signal-to-cladding mode coupling spectral profile. Due to the difference between the effective refractive indices of the signal mode and the cladding modes, the cladding modes will not experience a phase shift given by an integer multiple of π on passing through spacer regions (as is the case for the signal mode at $\lambda_{res}$). It follows that Δk(z) in Eq. 3 varies as a function of position z and coupling strength γ(L) is reduced relative to the reference device of FIG. 17A. $L_{spacer}(q)$ and variation in the phase for cladding mode 2 versus segment number q are plotted in FIGS. 18 and 19, respectively.

Division of the initially uniformly spaced diffractive element set into separate segments or subsets of diffractive elements results in additional maxima in the reflection spectra of the signal and loss modes. Fourier analysis may be applied to analyze locations of the additional maxima. For example, for the signal mode, the additional maxima are spaced at a free spectral range FSR given approximately by $$FSR = \lambda^2 / (2 n_{sig}(L_{seg} + L_{spacer}(q))). \quad \text{Eq. (6)}$$

Since $L_{spacer}(q)$ varies among the spacer regions, the FSR is chirped and the additional reflective maxima of the signal mode will spectrally broaden and exhibit reduced intensity at any given wavelength compared to the case of constant $L_{spacer}$. With suitable choice of $L_{spacer}(q)$ and $L_{seg}$, the impact of the segmentation on the spectral transfer function of the signal mode may be reduced, minimized, or substantially eliminated. Accordingly, in the exemplary embodiment of FIG. 17B, the maximum $L_{spacer}(q)$ is limited to approximately 12 µm in order to keep the additional reflection maxima more than 30 nm away from the main reflection spectral maximum for the signal optical mode.

Figure 20:
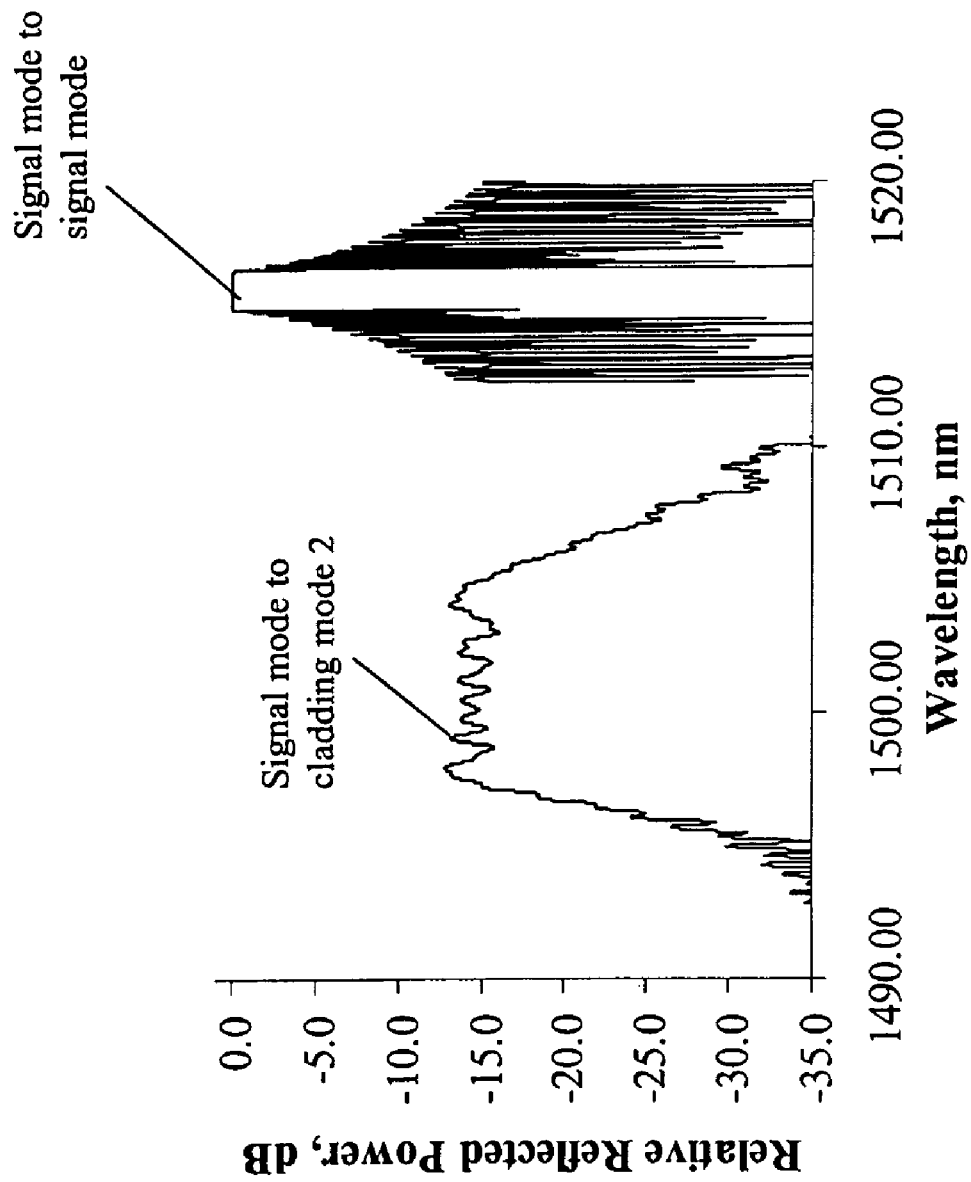
FIG. 20 illustrates a spectral reflection profile for the exemplary embodiment of FIG. 17B.
Figure 21:
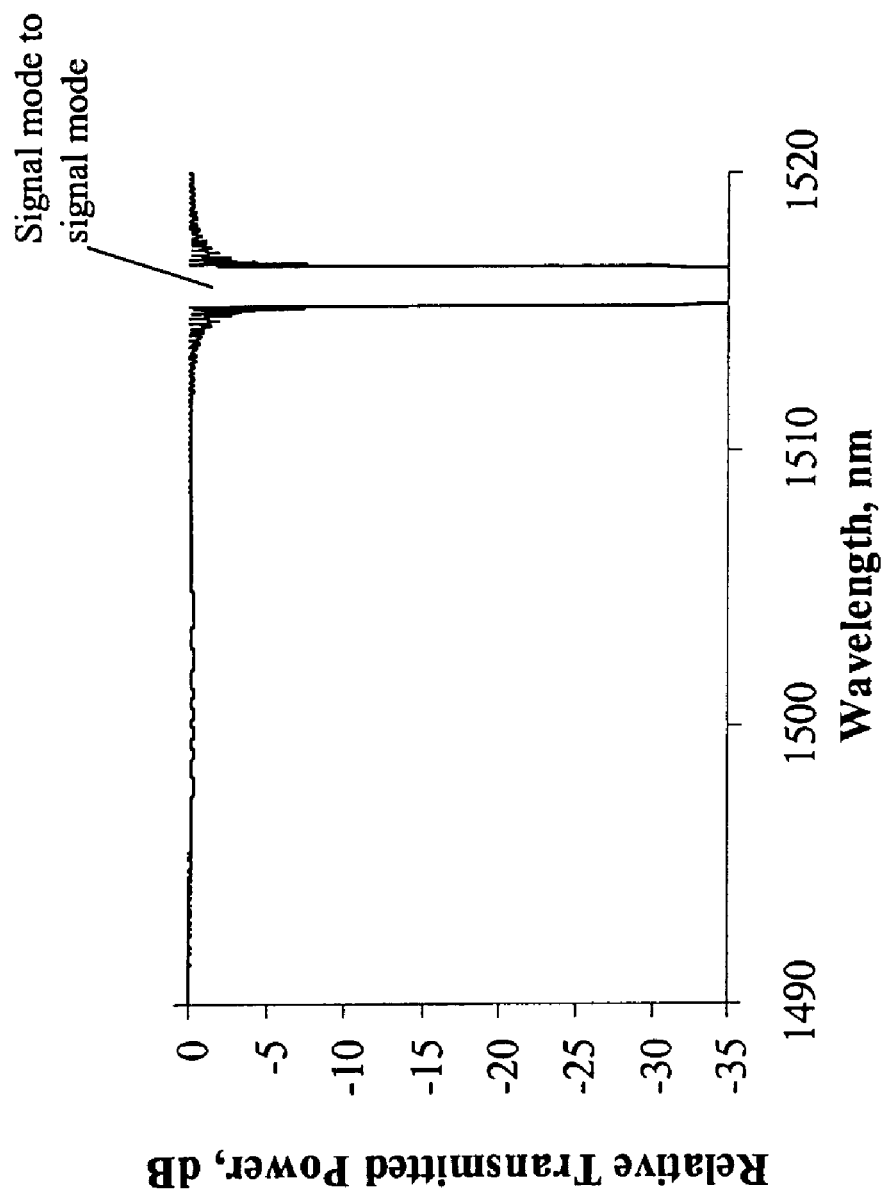
FIG. 21 illustrates a spectral transmission profile for the exemplary embodiment of FIG. 17B.

The reflection spectrum of the signal mode in the vicinity of $\lambda_{res}$ is substantially similar for the reference device of FIG. 17A and the exemplary embodiment of FIG. 17B. Additional reflective maxima resulting form the segmentation of the diffractive element set are more than 30 nm away from $\lambda_{res}$. The reflectivity of the diffractive elements was adjusted in the simulation for ease of comparison (i.e. so that the reflective bandwidth intensity of the signal mode is the same as that of the reference device of FIG. 17A; reference spectrum shown in FIG. 15). The reflective maximum corresponding back-reflection of the cladding modes, as well as coupling of the signal mode to the cladding modes, are broadened, reduced in intensity, and shifted away from $\lambda_{res}$ (FIG. 20). The (inverted) peak loss in the transmission spectrum shown in the FIG. 17 for the reference device is reduced by more than 10 dB, as shown in the transmission spectrum shown in FIG. 21.

It should be noted that other numbers of subsets or segments, including smaller number of segments or only two segments, may be sufficient to reduce unwanted optical coupling between signal and loss modes to an operationally acceptable level, or if such unwanted coupling is to be suppressed for a narrower operational wavelength range.

While the adaptations disclosed herein for reducing or substantially eliminating unwanted optical coupling between signal modes and loss modes have been described for diffractive element sets in planar optical waveguides, it should be noted that such adaptations may also be implemented for diffractive element sets in other optical waveguides as well, including optical fibers. Implementation of the disclosed adaptations in any suitable optical waveguide shall fall within the scope of the present disclosure or appended claims.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical apparatus, comprising a planar optical waveguide having at least one set of diffractive elements, the planar optical waveguide arranged to substantially confine in at least one transverse spatial dimension optical signals propagating therein, wherein:
   each diffractive element set is arranged to route, between corresponding input and output optical ports, a corresponding diffracted portion of an input optical signal propagating in the planar optical waveguide that is diffracted by the diffractive element set;
   the diffractive elements are arranged so that the input optical signal is successively incident thereon;
   the planar optical waveguide is arranged so that optical signals can propagate therein only in a fixed number of corresponding signal optical transverse modes substantially confined in at least one transverse dimension by the planar optical waveguide;
   the planar optical waveguide is arranged so that a modal index of the signal optical mode spatially varies along an optical signal propagation direction within the planar optical waveguide;
   said signal modal index variation yields a level of optical coupling between the signal optical mode and a loss optical mode at or below an operationally acceptable level; and
   the planar optical waveguide comprises a waveguide core, and spatial variation along the propagation direction of a bulk refractive index of core material provides said signal modal index variation.

2. The apparatus of claim 1, wherein physical spacing along the propagation direction between adjacent diffractive elements spatially varies along the propagation direction, so as to provide a desired spectral transfer function for the diffractive element set and so as to provide said signal modal index variation.

3. The apparatus of claim 1, wherein:
   the diffractive element set comprises multiple subsets of diffractive elements separated by intervening regions of the planar optical waveguide lacking diffractive elements of the set; and
   the subsets and the intervening regions are arranged along the propagation direction so as to provide a desired spectral transfer function for the diffractive element set and so as to provide said signal modal index variation.

4. The apparatus of claim 1, wherein the planar optical waveguide comprises a waveguide core, and spatial variation along the propagation direction of the transverse extent of the core in at least one transverse dimension provides said signal modal index variation.

5. The apparatus of claim 1, wherein the planar optical waveguide comprises a waveguide core and cladding, and spatial variation along the propagation direction of a transverse position of an interface between the core and the cladding provides said signal modal index variation.

6. An optical apparatus, comprising a planar optical waveguide having at least one set of diffractive elements, the planar optical waveguide arranged to substantially confine in at least one transverse spatial dimension optical signals propagating therein, wherein:
   each diffractive element set is arranged to route, between corresponding input and output optical ports, a corresponding diffracted portion of an input optical signal propagating in the planar optical waveguide that is diffracted by the diffractive element set;
   the diffractive elements are arranged so that the input optical signal is successively incident thereon;
   the planar optical waveguide is arranged so that the optical signals propagate in the planar optical waveguide in corresponding signal optical transverse modes substantially confined in at least one transverse dimension by the planar optical waveguide;
   the planar optical waveguide is arranged so that the loss optical mode propagates with only negligible optical scattering and with only negligible optical absorption; and
   the planar optical waveguide is arranged so that a modal index of at least one loss optical mode spatially varies along the optical signal propagation direction within the planar optical waveguide; and
   said loss modal index variation yields a level of optical coupling between the signal optical mode and the loss optical mode at or below an operationally acceptable level.

7. The apparatus of claim 6, wherein the planar optical waveguide comprises a waveguide core and cladding, and spatial variation along the propagation direction of a bulk refractive index of cladding material provides said loss modal index variation.

8. The apparatus of claim 6, wherein the planar optical waveguide comprises a waveguide core and cladding, and spatial variation along the propagation direction of the transverse extent of the cladding in at least one transverse dimension provides said loss modal index variation.

9. The apparatus of claim 6, wherein the planar optical waveguide comprises a waveguide core and cladding, and spatial variation along the propagation direction of a transverse position of an interface between the core and the cladding provides said loss modal index variation.

10. The apparatus of claim 6, wherein the planar optical waveguide comprises a slab optical waveguide arranged to substantially confine in one transverse spatial dimension optical signals propagating in two other spatial dimensions therein.

11. The apparatus of claim 6, wherein the planar optical waveguide comprises a channel optical waveguide arranged to substantially confine in two transverse spatial dimensions optical signals propagating in one other spatial dimension therein.

12. The apparatus of claim 6, wherein said loss modal index variation results in a phase mismatch between the signal optical mode and the loss optical mode, the phase mismatch varying along the propagation direction so as to yield a level of optical coupling between the signal optical mode and the loss optical mode at or below an operationally acceptable level.

13. The apparatus of claim 12, wherein a product of: i) a length of the diffractive element set along the propagation direction; and ii) a mean magnitude of the phase mismatch averaged over said length of the diffractive element set, is greater than about $\pi$.

14. The apparatus of claim 12, wherein the phase mismatch varies substantially linearly along the propagation direction.

15. The apparatus of claim 12, wherein the phase mismatch varies substantially periodically along the propagation direction.

16. The apparatus of claim 12, wherein the phase mismatch varies irregularly along the propagation direction.

17. The apparatus of claim 12, wherein the phase mismatch varies substantially randomly along the propagation direction.

18. An optical apparatus, comprising a planar optical waveguide having at least one set of diffractive elements, the planar optical waveguide arranged to substantially confine in at least one transverse spatial dimension optical signals propagating therein, wherein:
   each diffractive element set is arranged to route, between corresponding input and output optical ports, a corresponding diffracted portion of an input optical signal propagating in the planar optical waveguide that is diffracted by the diffractive element set;
   the diffractive elements are arranged so that the input optical signal is successively incident thereon;
   the planar optical waveguide is arranged so that optical signals can propagate therein only in a fixed number of corresponding signal optical transverse modes substantially confined in at least one transverse dimension by the planar optical waveguide;
   the planar optical waveguide is arranged so that a modal index of the signal optical mode spatially varies along an optical signal propagation direction within the planar optical waveguide;
   said signal modal index variation yields a level of optical coupling between the signal optical mode and a loss optical mode at or below an operationally acceptable level; and
   the planar optical waveguide is arranged so that optical signals can propagate therein only in a corresponding lowest-order signal optical transverse mode substantially confined in at least one transverse dimension by the planar optical waveguide.

19. An optical apparatus, comprising a planar optical waveguide having at least one set of diffractive elements, the planar optical waveguide arranged to substantially confine in at least one transverse spatial dimension optical signals propagating therein, wherein:
   each diffractive element set is arranged to route, between corresponding input and output optical ports, a corresponding diffracted portion of an input optical signal propagating in the planar optical waveguide that is diffracted by the diffractive element set;
   the diffractive elements are arranged so that the input optical signal is successively incident thereon;
   the planar optical waveguide is arranged so that optical signals can propagate therein only in a fixed number of corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and a loss optical mode at or below an operationally acceptable level;

said signal modal index variation results in a phase mismatch between the signal optical mode and a loss optical mode, the phase mismatch varying along the propagation direction so as to yield a level of optical coupling between the signal optical mode and the loss optical mode at or below an operationally acceptable level; and a product of: i) a length of the diffractive element set along the propagation direction; and ii) a mean magnitude of the phase mismatch averaged over said length of the diffractive element set, is greater than about $\pi$.

20. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that optical signals can propagate therein only in a fixed number of corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and a loss optical mode at or below an operationally acceptable level;

said signal modal index variation results in a phase mismatch between the signal optical mode and a loss optical mode, the phase mismatch varying along the propagation direction so as to yield a level of optical coupling between the signal optical mode and the loss optical mode at or below an operationally acceptable level; and the phase mismatch varies substantially linearly along the propagation direction.

21. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that optical signals can propagate therein only in a fixed number of corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and a loss optical mode at or below an operationally acceptable level;

said signal modal index variation results in a phase mismatch between the signal optical mode and a loss optical mode, the phase mismatch varying along the propagation direction so as to yield a level of optical coupling between the signal optical mode and the loss optical mode at or below an operationally acceptable level; and the phase mismatch varies substantially periodically along the propagation direction.

22. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that optical signals can propagate therein only in a fixed number of corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and a loss optical mode at or below an operationally acceptable level;

said signal modal index variation results in a phase mismatch between the signal optical mode and a loss optical mode, the phase mismatch varying along the propagation direction so as to yield a level of optical coupling between the signal optical mode and the loss optical mode at or below an operationally acceptable level; and the phase mismatch varies irregularly along the propagation direction.

23. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that optical signals can propagate therein only in a fixed number of corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and a loss optical mode at or below an operationally acceptable level;

said signal modal index variation results in a phase mismatch between the signal optical mode and a loss optical mode, the phase mismatch varying along the propagation direction so as to yield a level of optical coupling between the signal optical mode and the loss optical mode at or below an operationally acceptable level; and the phase mismatch varies substantially randomly along the propagation direction.

24. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that the optical signals propagate therein in corresponding signal optical transverse modes substantially confined in at least one transverse dimension by the planar optical waveguide;

the planar optical waveguide is arranged so that a modal index of the signal optical mode spatially varies along an optical signal propagation direction within the planar optical waveguide;

said signal modal index variation yields a level of optical coupling between the signal optical mode and the loss optical mode at or below an operationally acceptable level; and the planar optical waveguide comprises a waveguide core, and spatial variation along the propagation direction of a bulk refractive index of core material provides said signal modal index variation.

25. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that the optical signals propagate therein in corresponding signal optical transverse modes substantially confined in at least one transverse dimension by the planar optical waveguide;

the planar optical waveguide is arranged so that a modal index of at least one loss optical mode spatially varies along the optical signal propagation direction within the planar optical waveguide;

said loss modal index variation yields a level of optical coupling between the signal optical mode and the loss optical mode at or below an operationally acceptable level; and the planar optical waveguide comprises a waveguide core and cladding, and spatial variation along the propagation direction of a bulk refractive index of cladding material provides said loss modal index variation.

26. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that the optical signals propagate therein in corresponding signal optical transverse modes substantially confined in at least one transverse dimension by the planar optical waveguide;

the planar optical waveguide is arranged so that a modal index of at least one loss optical mode spatially varies along the optical signal propagation direction within the planar optical waveguide;

said loss modal index variation yields a level of optical coupling between the signal optical mode and the loss optical mode at or below an operationally acceptable level; and the planar optical waveguide comprises a waveguide core and cladding, and spatial variation along the propagation direction of a transverse position of an interface between the core and the cladding provides said loss modal index variation.

27. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that the optical signals propagate therein in corresponding signal optical transverse modes substantially confined in at least one transverse dimension by the planar optical waveguide;

the planar optical waveguide is arranged so that a modal index of the signal optical mode or a modal index of at least one loss optical mode spatially varies along the optical signal propagation direction within the planar optical waveguide;

said signal modal index variation or said loss modal index variation results in a phase mismatch between the signal optical mode and the loss optical mode, the phase mismatch varying along the propagation direction so as to yield a level of optical coupling between the signal optical mode and the loss optical mode at or below an operationally acceptable level; and a product of: i) a length of the diffractive element set along the propagation direction; and ii) a mean magnitude of the phase mismatch averaged over said length of the diffractive element set, is greater than about $\pi$.

28. An optical apparatus, comprising a planar optical waveguide having at least one set of diffractive elements, the planar optical waveguide arranged to substantially confine in at least one transverse spatial dimension optical signals propagating therein, wherein:

each diffractive element set is arranged to route, between corresponding input and output optical ports, a corresponding diffracted portion of an input optical signal propagating in the planar optical waveguide that is diffracted by the diffractive element set;

the diffractive elements are arranged so that the input optical signal is successively incident thereon;

the planar optical waveguide is arranged so that the optical signals propagate therein in corresponding signal optical transverse modes substantially confined in at least one transverse dimension by the planar optical waveguide;

the planar optical waveguide is arranged so that a modal index of the signal optical mode or a modal index of at least one loss optical mode spatially varies along the optical signal propagation direction within the planar optical waveguide;

said signal modal index variation or said loss modal index variation results in a phase mismatch between the signal optical mode and the loss optical mode, the phase mismatch varying along the propagation direction so as to yield a level of optical coupling between the signal optical mode and the loss optical mode at or below an operationally acceptable level; and the phase mismatch varies substantially periodically along the propagation direction.

* * * * *